US009218142B2

(12) United States Patent
Hamedani et al.

(10) Patent No.: US 9,218,142 B2
(45) Date of Patent: Dec. 22, 2015

(54) LOG DATA STORE THAT STORES DATA ACROSS A PLURALITY OF STORAGE DEVICES USING NON-DISJOINT LAYERS

(71) Applicant: International Business Machines Corporation, Armonk, NY (US)

(72) Inventors: Mohammad Sadoghi Hamedani, White Plains, NY (US); Hans-Arno Jacobsen, Toronto (CA); Tilmann Rabl, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/973,413

(22) Filed: Aug. 22, 2013

(65) Prior Publication Data

US 2015/0058552 A1    Feb. 26, 2015

(51) Int. Cl.
   *G06F 12/00*  (2006.01)
   *G06F 3/06*   (2006.01)

(52) U.S. Cl.
   CPC ............ *G06F 3/0655* (2013.01); *G06F 3/0604* (2013.01); *G06F 3/0619* (2013.01); *G06F 3/0665* (2013.01); *G06F 3/0674* (2013.01); *G06F 3/0689* (2013.01)

(58) Field of Classification Search
   CPC ... G06F 3/0689; G06F 3/0674; G06F 3/0665; G06F 3/0655; G06F 3/0604
   See application file for complete search history.

(56) References Cited

U.S. PATENT DOCUMENTS

| 8,161,015 B2 | 4/2012 | Kennedy et al. |
| 8,407,403 B2 | 3/2013 | Prabhakaran et al. |
| 2006/0224639 A1* | 10/2006 | Watanabe et al. ............. 707/201 |
| 2009/0060195 A1* | 3/2009 | Mikami et al. ................. 380/277 |
| 2010/0161569 A1* | 6/2010 | Schreter ........................ 707/696 |
| 2010/0281208 A1 | 11/2010 | Yang |
| 2011/0258391 A1* | 10/2011 | Atkisson et al. .............. 711/118 |
| 2012/0072656 A1* | 3/2012 | Archak et al. ................. 711/104 |
| 2012/0131265 A1* | 5/2012 | Koltsidas et al. ............. 711/103 |
| 2012/0246403 A1 | 9/2012 | McHale et al. |

(Continued)

OTHER PUBLICATIONS

Athanassoulis et al., "MaSM: Efficient Online Updates in Data Warehouses", Proceedings of the 2011 ACM SIGMOD International Conference on Management of Data (SIGMOD '11), Jun. 2011, pp. 865-876.

(Continued)

*Primary Examiner* — Larry Mackall
(74) *Attorney, Agent, or Firm* — Yee & Associates, P.C.; Anne Dougherty

(57) ABSTRACT

Storing data records within a log data store is provided. The log data store that stores data records within a plurality of successive non-disjoint layers inserted across a plurality of different types of data storage devices associated with a data processing system is generated. A first non-disjoint layer of the plurality of successive non-disjoint layers is inserted within a main memory device. A set of intermediate non-disjoint layers of the plurality of successive non-disjoint layers is inserted within a set of storage-class memory devices. A last non-disjoint layer of the plurality of successive non-disjoint layers is inserted within a hard disk drive. A size of each successive non-disjoint layer in the plurality of successive non-disjoint layers is increased exponentially. The data records are organized into the plurality of successive non-disjoint layers of the log data store inserted across the plurality of different types of data storage devices.

8 Claims, 19 Drawing Sheets

(56) References Cited

U.S. PATENT DOCUMENTS

| | | | |
|---|---|---|---|
| 2012/0278532 A1* | 11/2012 | Bolanowski | 711/103 |
| 2012/0317338 A1 | 12/2012 | Yi et al. | |
| 2013/0086307 A1 | 4/2013 | Kurashige | |
| 2014/0164694 A1* | 6/2014 | Storer | 711/114 |
| 2015/0058556 A1 | 2/2015 | Hamedani et al. | |

OTHER PUBLICATIONS

Bender et al., "Cache-Oblivious Streaming B-Trees," Proceedings of the Nineteenth Annual ACM Symposium on Parallel Algorithms and Architectures (SPAA '07), Jun. 2007, pp. 81-92.

Bhattacharjee et al., "Enhancing Recovery Using an SSD Buffer Pool Extension", Proceedings of the Seventh International Workshop on Data Management on New Hardware (DaMoN 2011), Jun. 2011, pp. 10-16.

Bhattacharjee et al., "Managing a Multi-Version Database," U.S. Appl. No. 13/904,219, filed May 29, 2013, 67 pages.

Bhattacharjee et al., "Managing a Multi-Version Database," U.S. Appl. No. 13/969,537, filed Aug. 17, 2013, 66 pages.

Bhattacharjee et al., "Storage Class Memory Aware Data Management," Bulletin of the Technical Committee on Data Engineering, vol. 33, No. 4, Dec. 2010, pp. 35-40.

Bhattacharjee et al., "Deferring Data Record Changes Using Query Rewriting," U.S. Appl. No. 14/020,076, filed Sep. 6, 2013, 52 pages.

Canim et al. "An Object Placement Advisor for DB2 Using Solid State Storage", Proceedings of the VLDB Endowment vol. 2, No. 2, Aug. 2009, pp. 1318-1329.

Canim et al. "SSD Bufferpool Extensions for Database Systems." Proceedings of the VLDB Endowment vol. 3, No. 1-2, Sep. 2010, pp. 1435-1446.

Chen et al., "DCSim: Design analysis on Virtualization Data Center," Proceedings of the 2012 9th International Conference on Ubiquitous Intelligence and Computing and 9th International Conference on Autonomic and Trusted Computing (UIC/ATC), Sep. 2012, pp. 900-905.

Jin et al., "FlashB-tree: A Novel B-tree Index Scheme for Solid State Drives," Proceedings of the 2011 ACM Symposium on Research in Applied Computation (RACS '11), Nov. 2011, pp. 50-55.

Lakshman et al., "Cassandra: A Decentralized Structured Storage System," ACM SIPOPS Operating Systems Review, vol. 44, No. 2, Apr. 2010, pp. 35-40.

Levandoski et al., "The Bw-Tree: A B-tree for New Hardware Platforms", Proceedings of the 29th IEEE International Conference on Data Engineering (ICDE 2013), Apr. 2013, 12 pages.

"LevelDB," Google Project Hosting, copyright 2013, 2 pages. Accessed Aug. 23, 2013, http://code.google.com/p/leveldb/.

Nath et al., "FlashDB: Dynamic Self-Tuning Database for NAND Flash," Proceedings of the 6th International Conference on Processing in Sensor Networks (IPSN '07), Apr. 2007, pp. 410-419.

O'Neil et al., "The Log-Structured Merge-Tree (LSM-tree)", Acta Informatica vol. 33, No. 4, Jun. 1996, pp. 351-385.

Sears et al., "bLSM: A General Purpose Log Structured Merge Tree", Proceedings of the 2012 International Conference on Management of Data (SIGMOD '12), May 2012, pp. 217-228.

Yang et al., "Hybrid Storage with Disk Based Write Cache," Proceedings of the 16th International Conference on Database Systems for Advanced Applications (DASFAA '11), Apr. 2011, pp. 264-275.

Office Action, dated May 7, 2015, regarding U.S. Appl. No. 14/023,220, 13 pages.

Notice of Allowance, dated Jul. 20, 2015, regarding U.S. Appl. No. 14/023,220, 12 pages.

\* cited by examiner

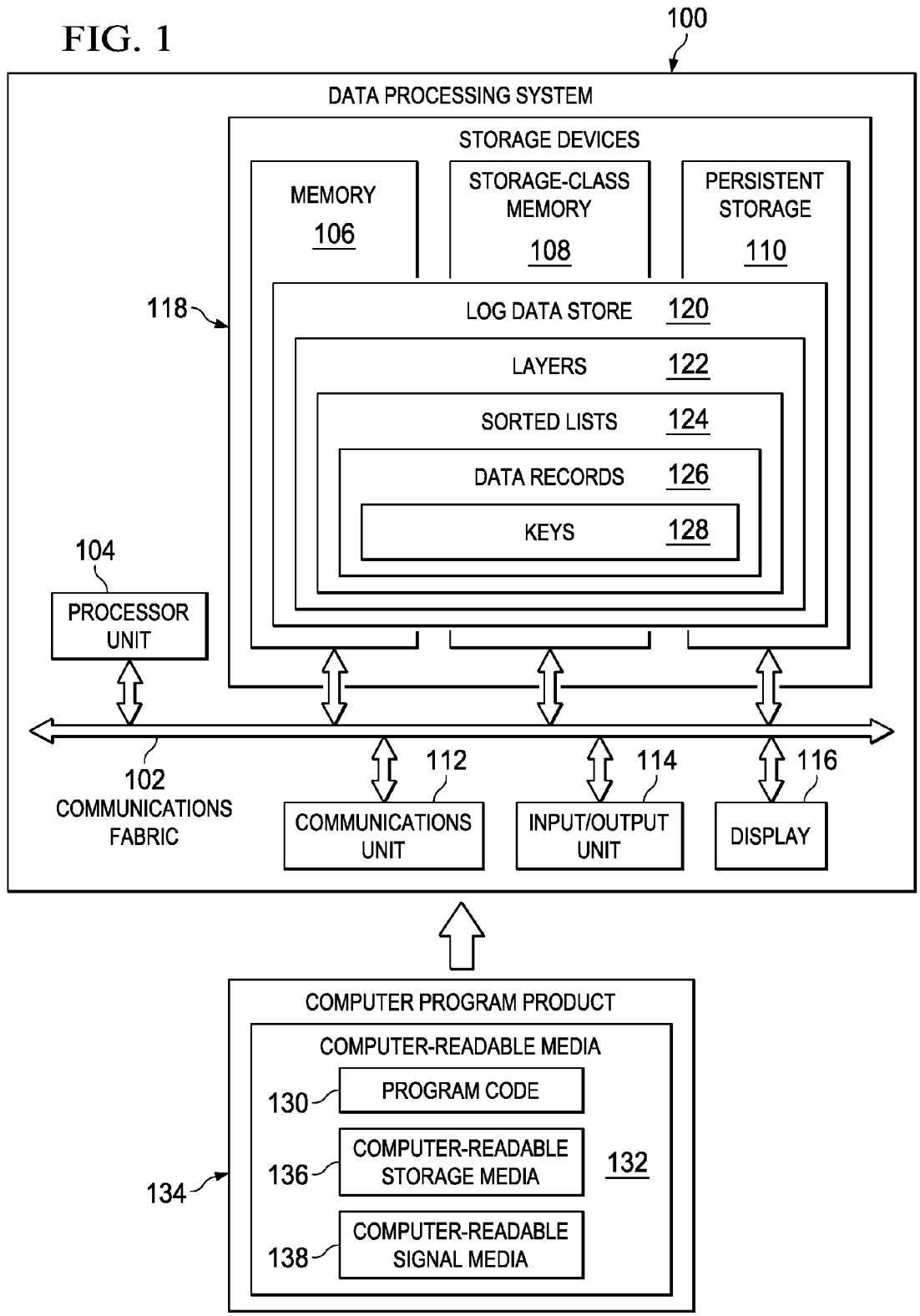

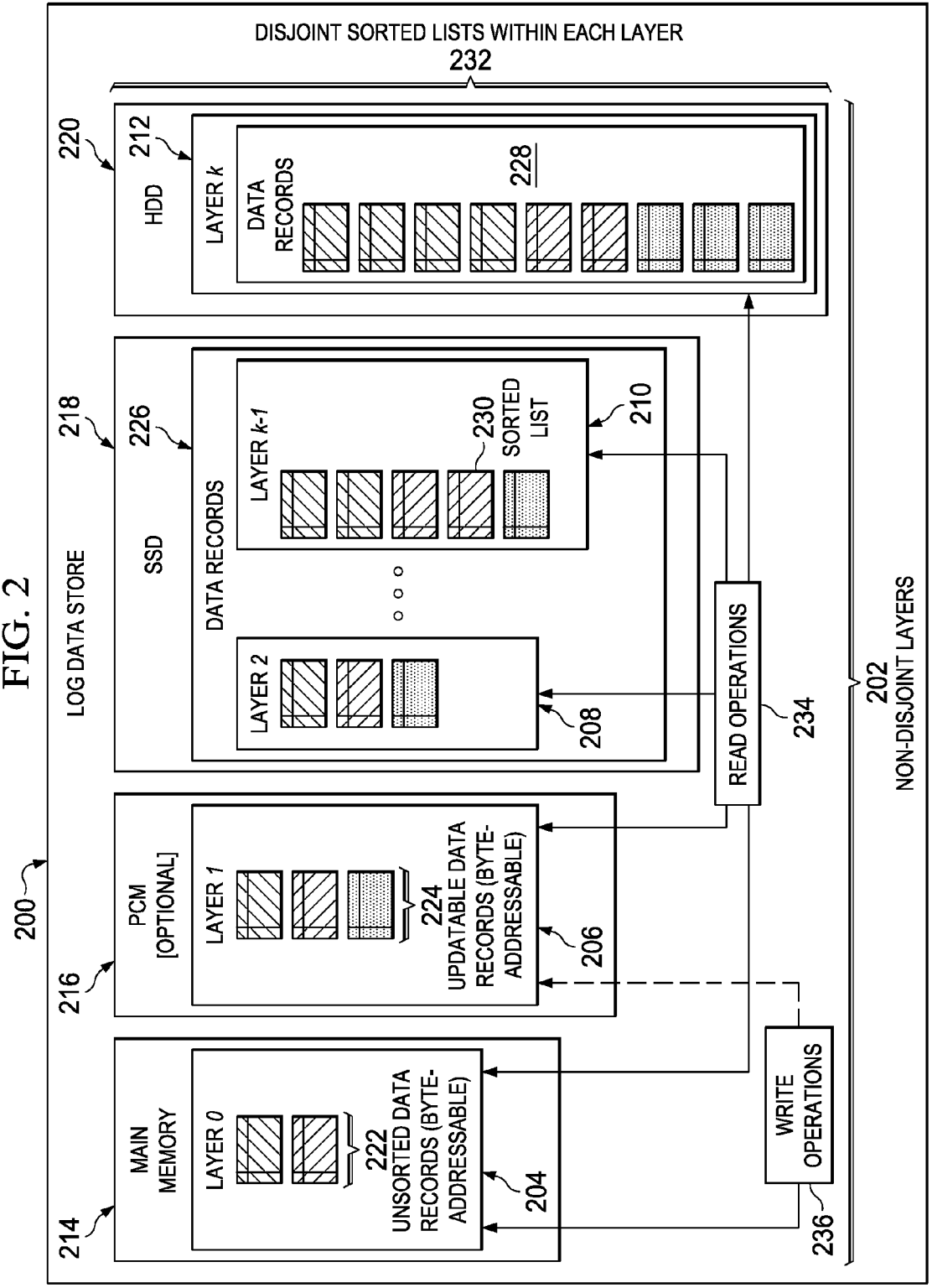

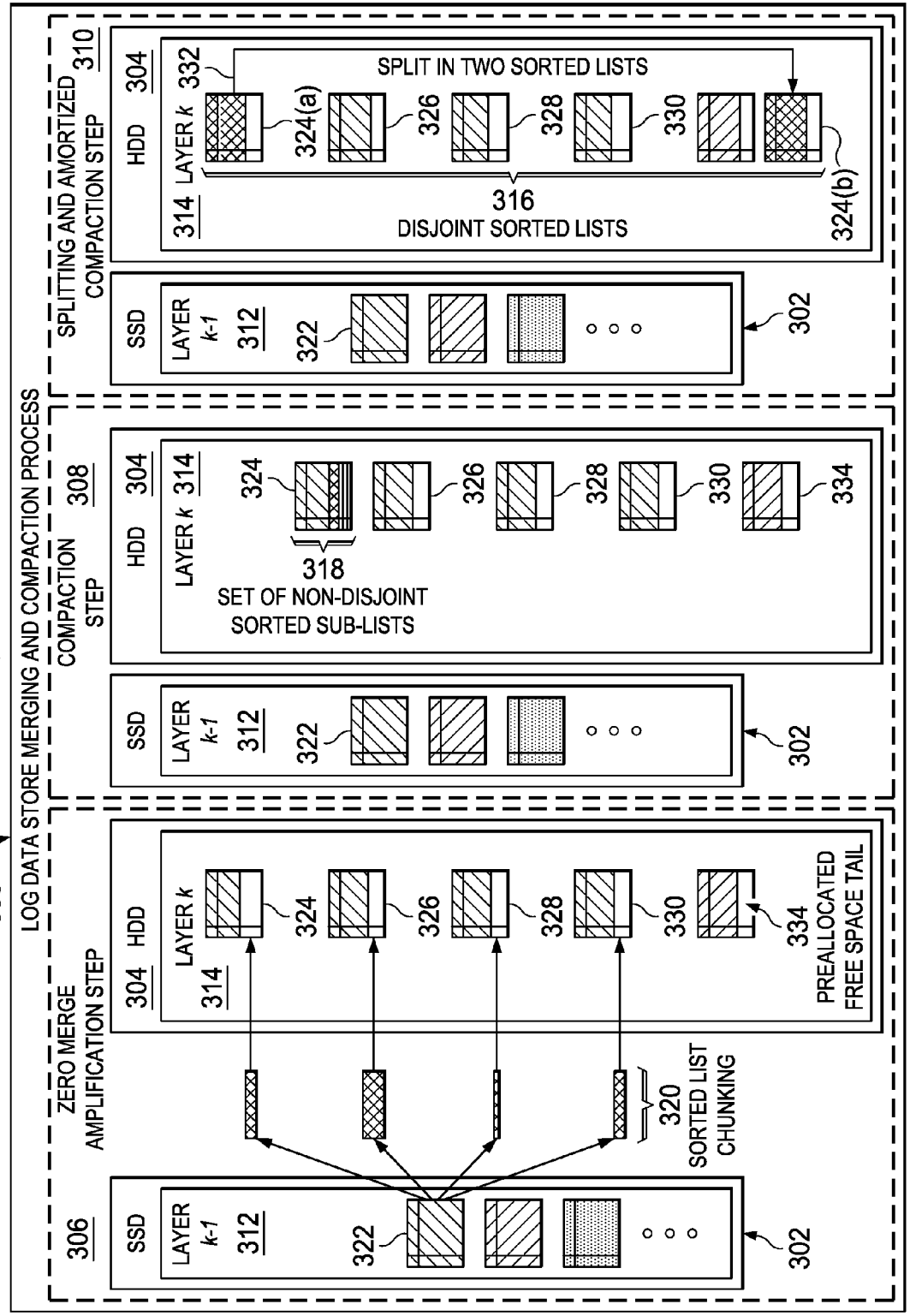

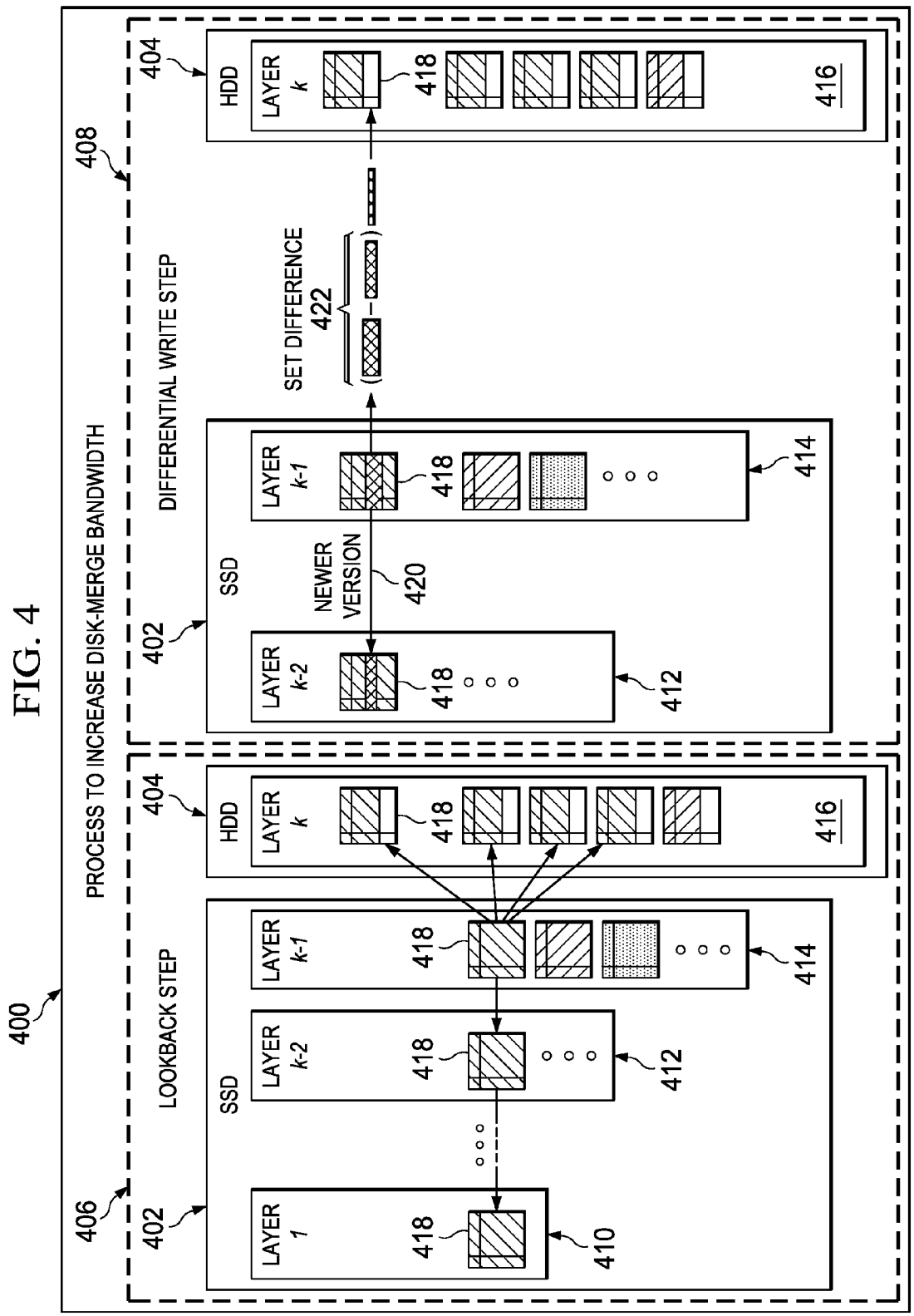

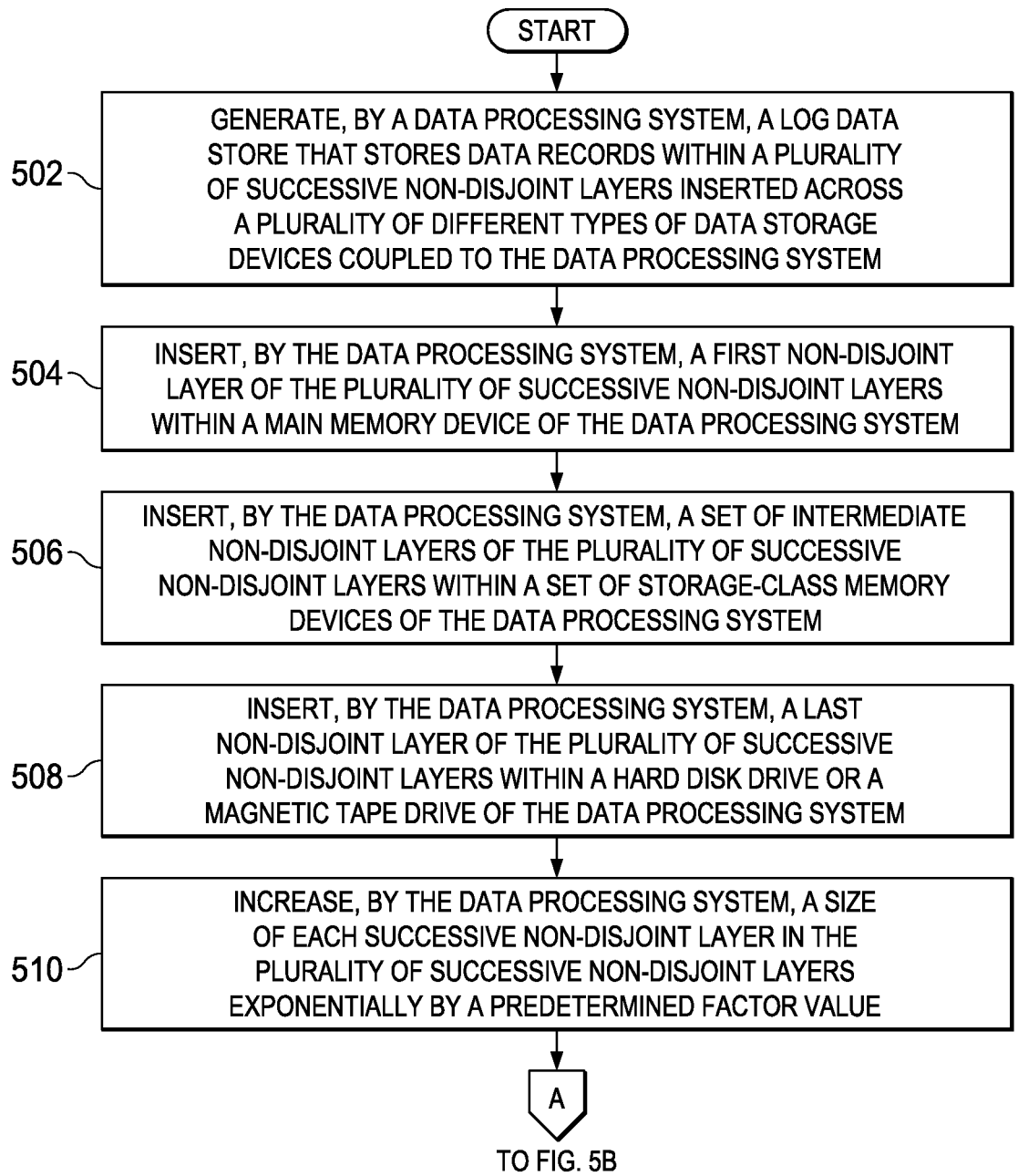

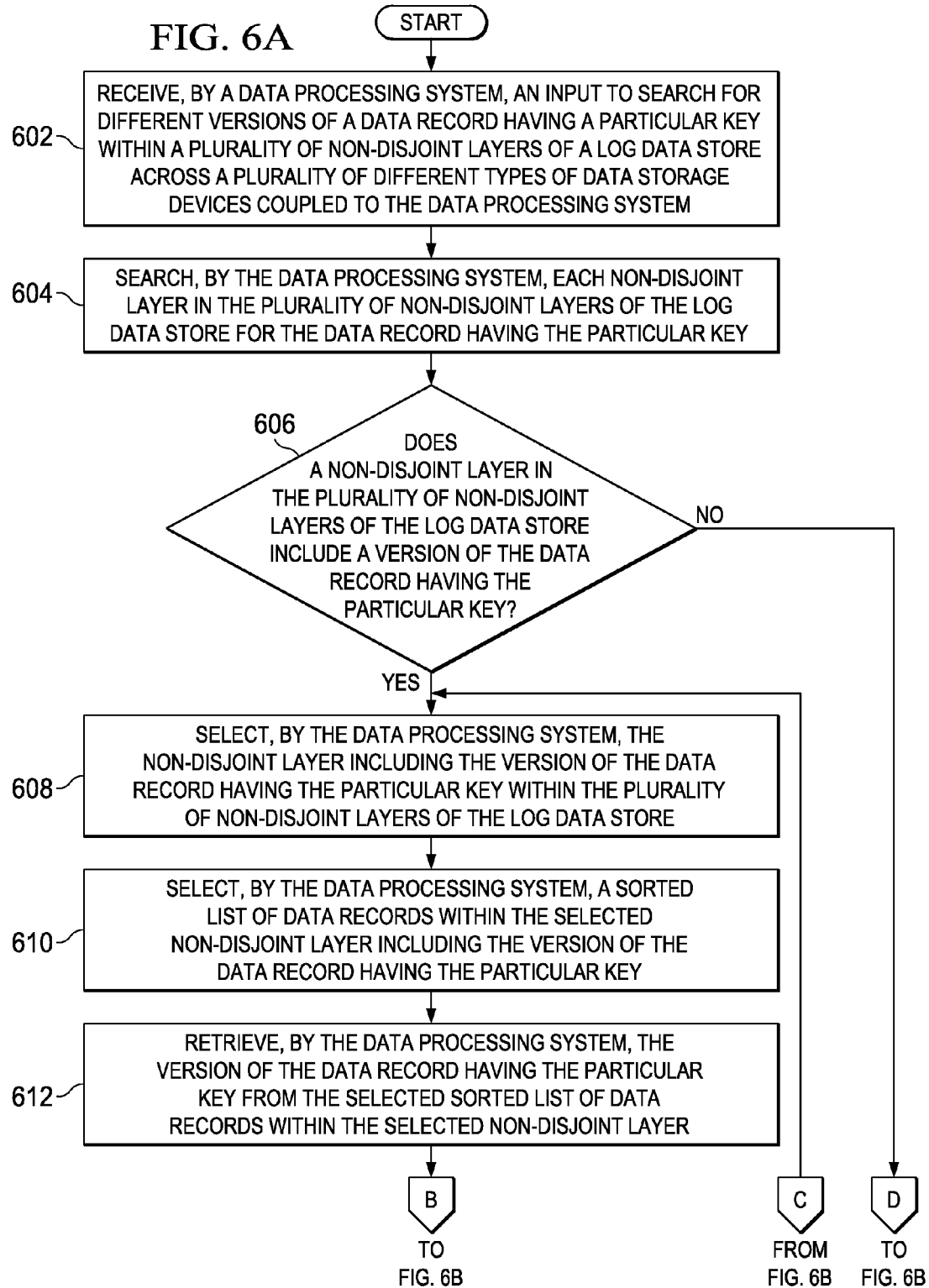

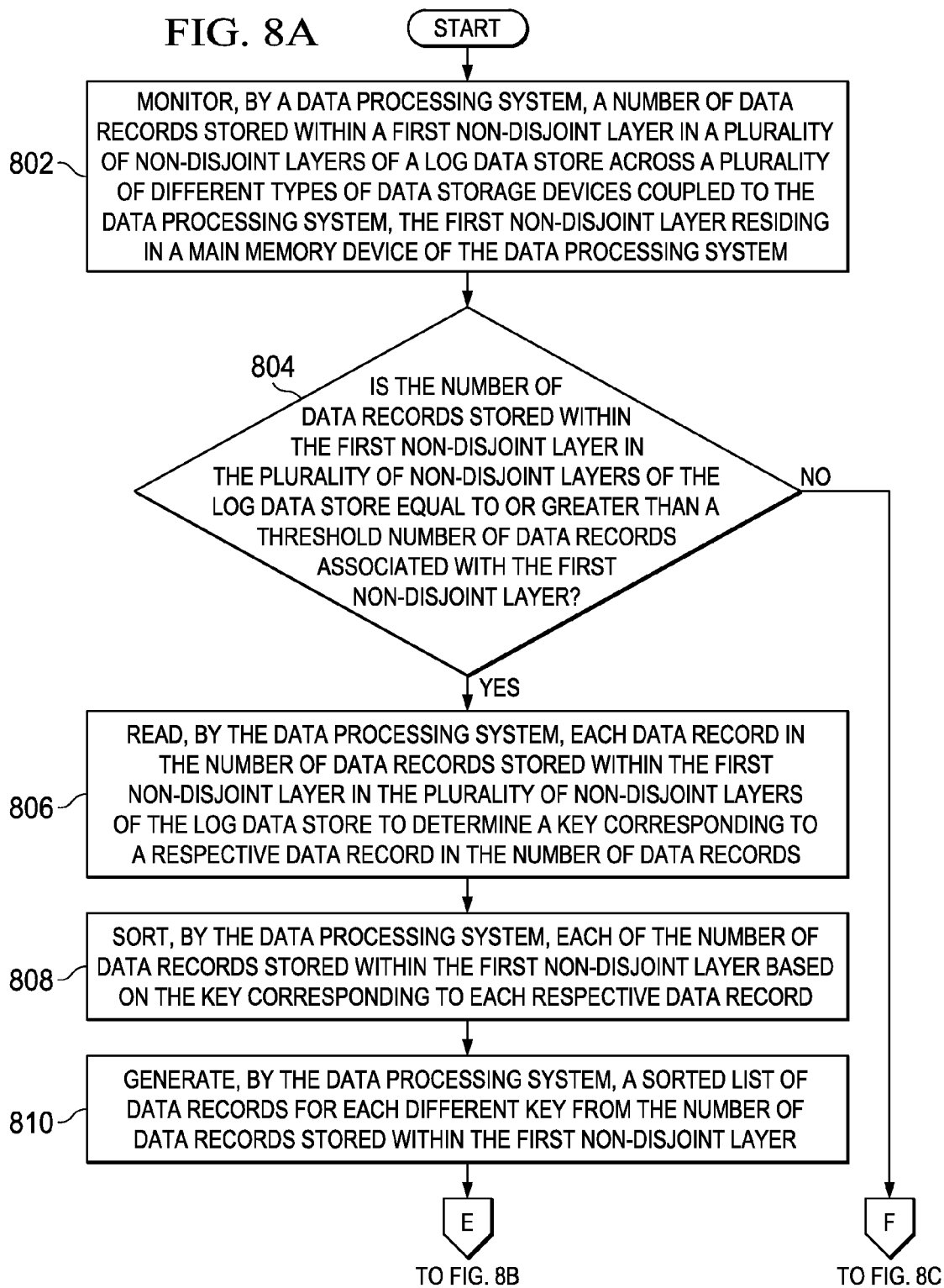

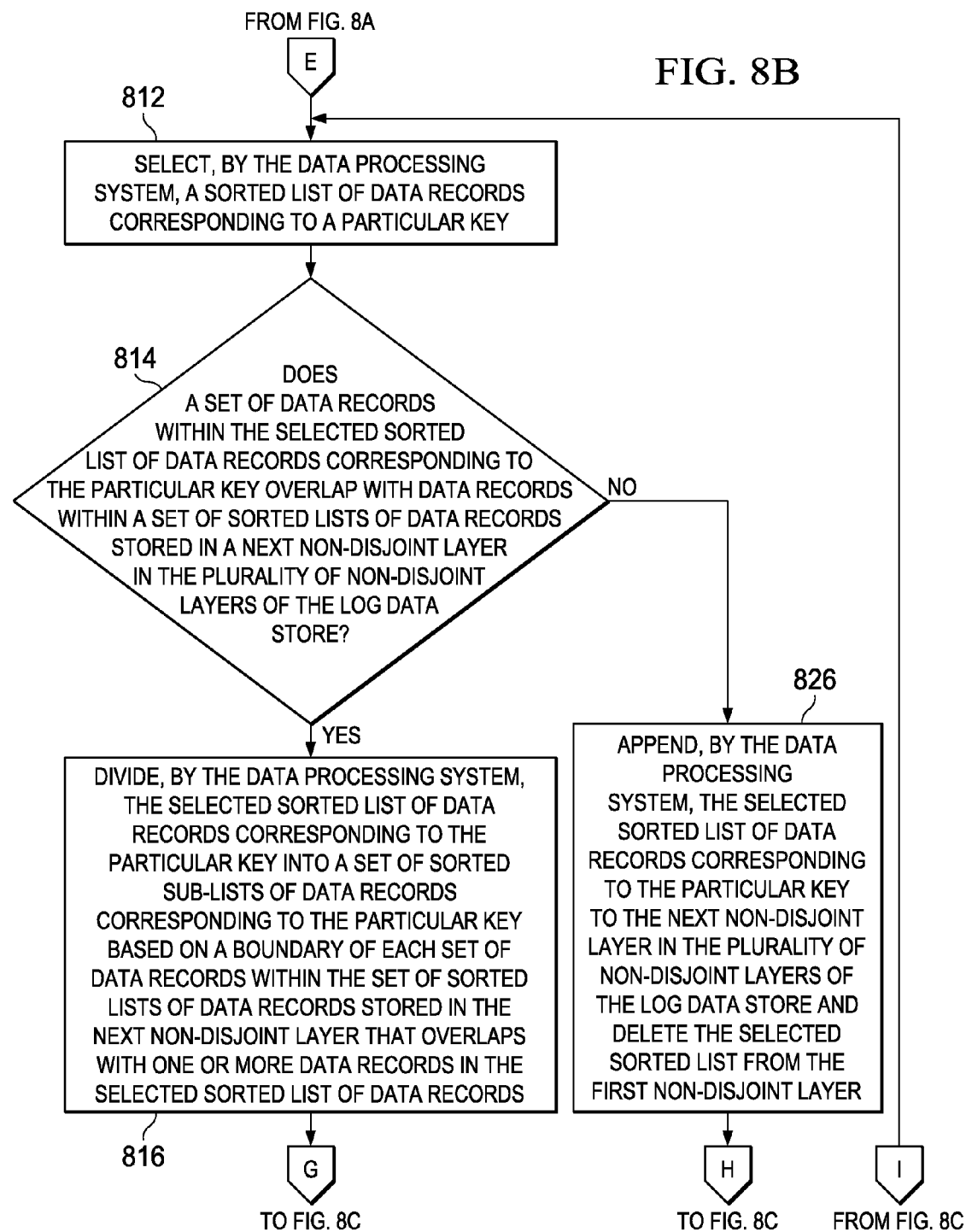

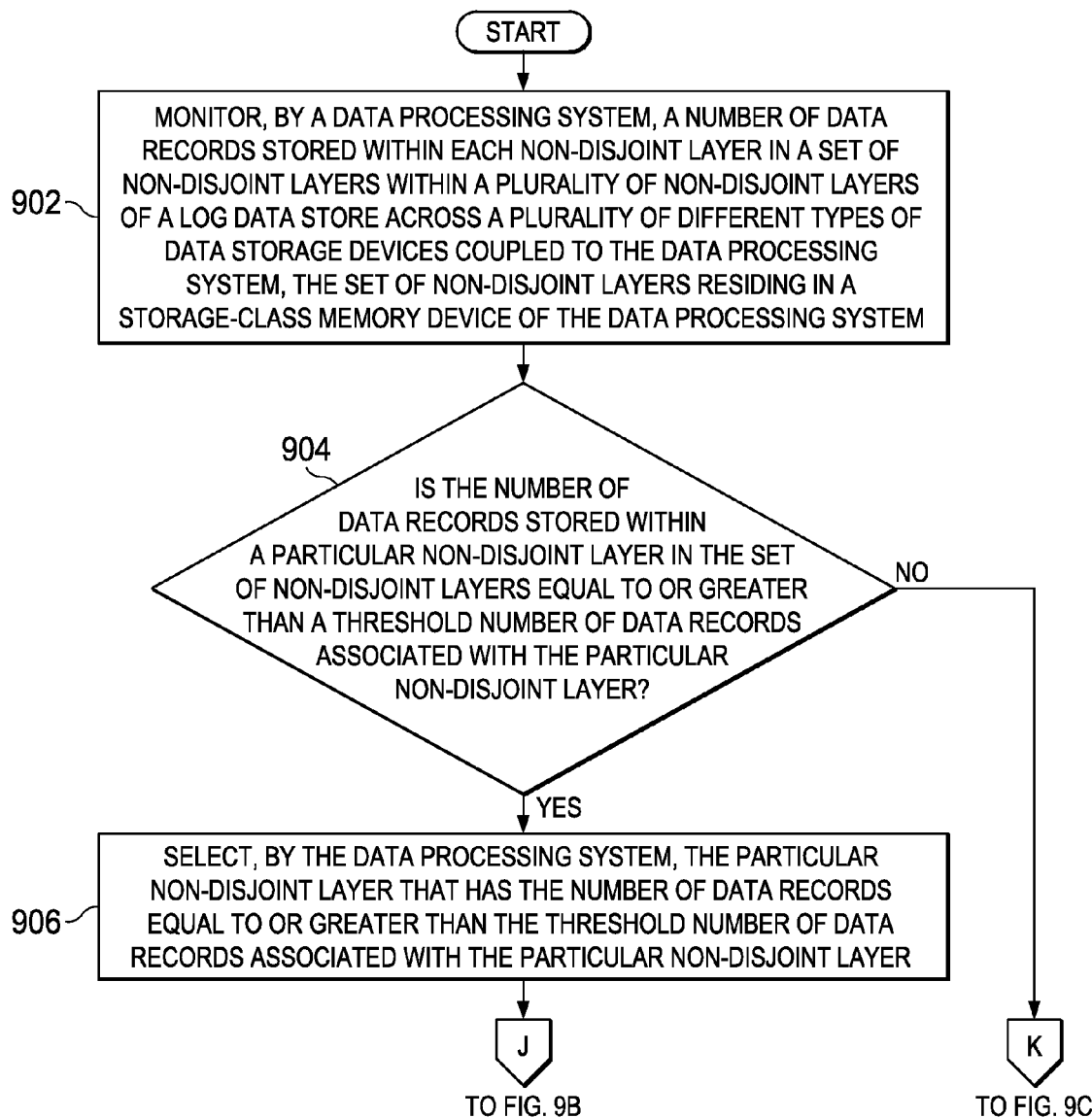

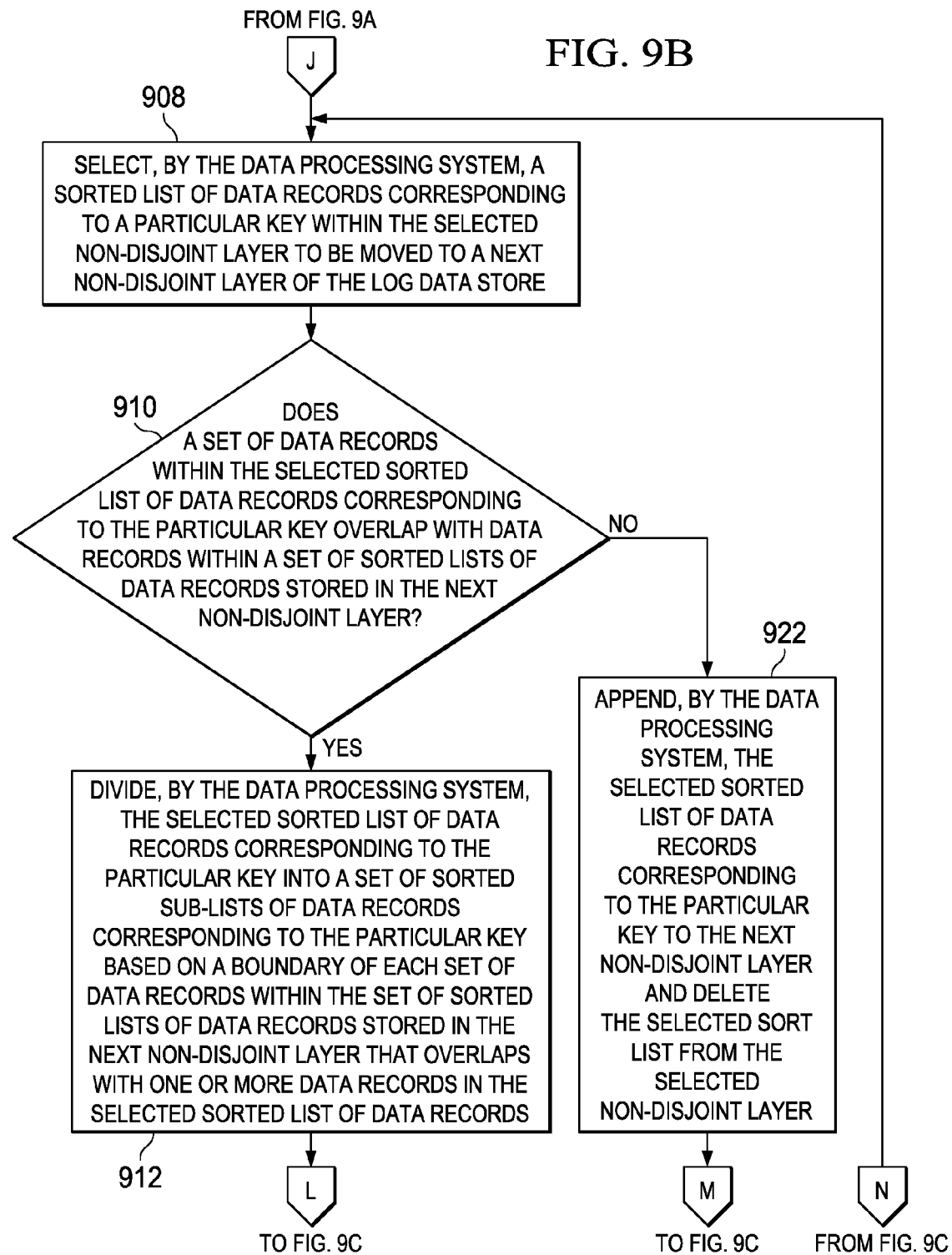

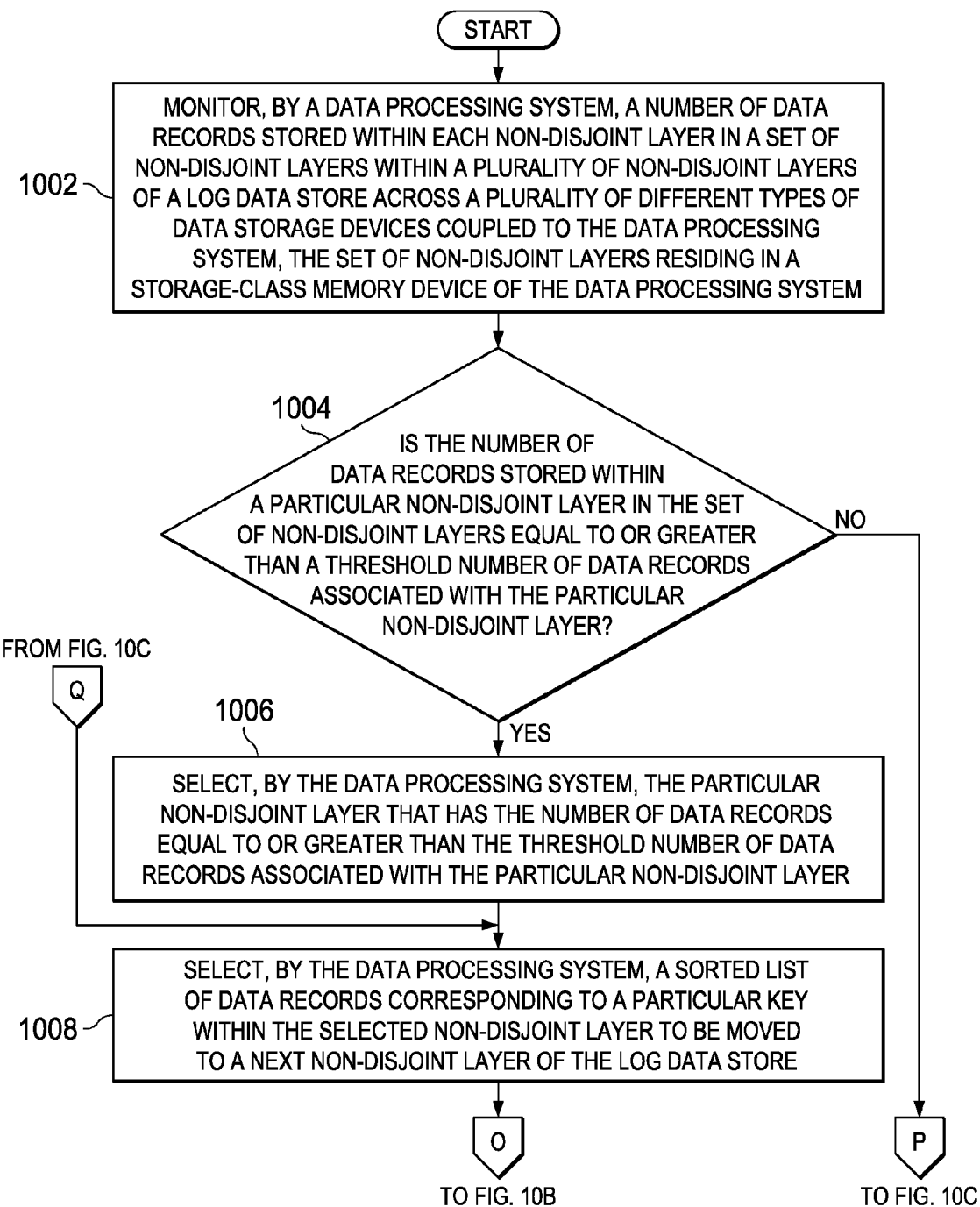

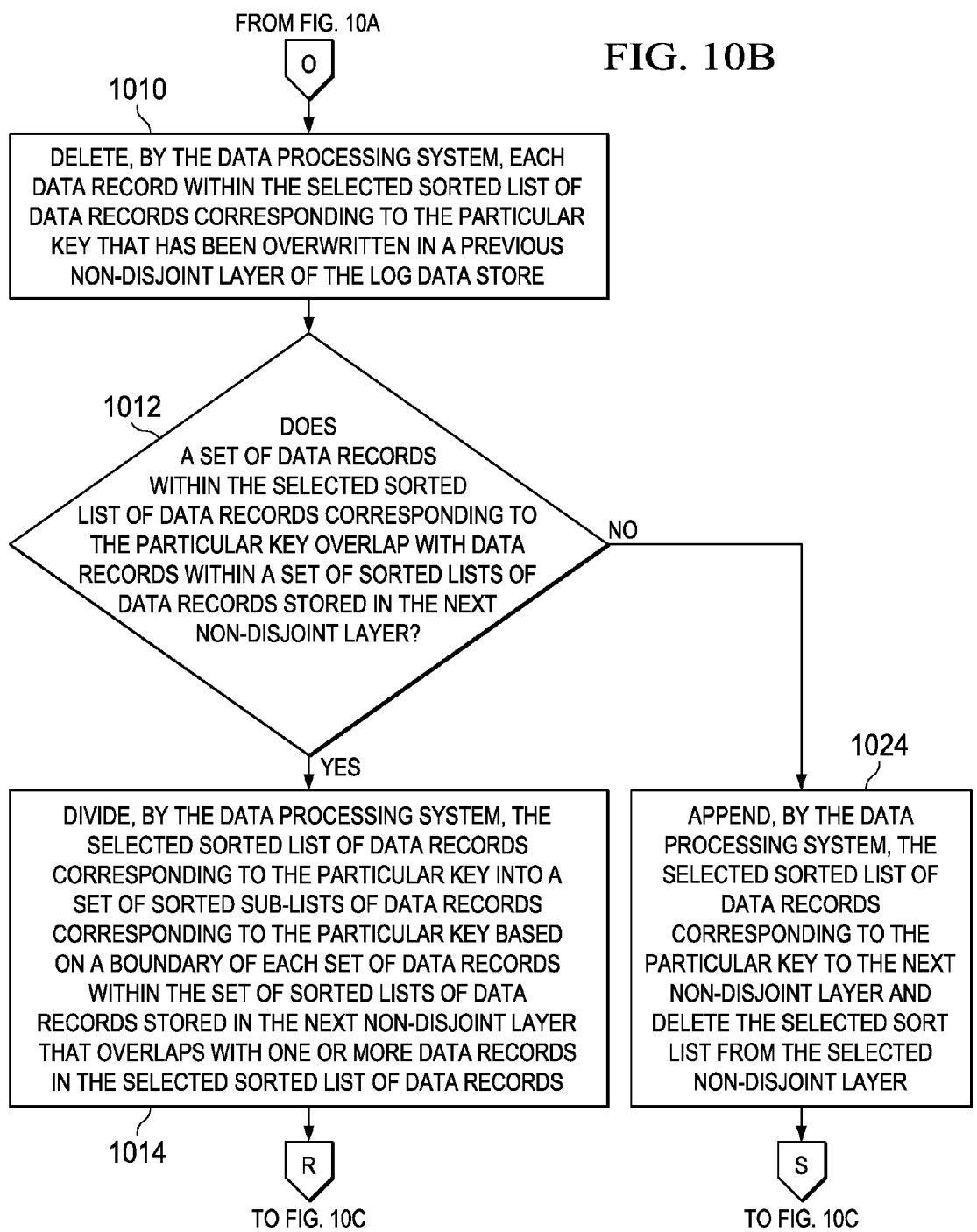

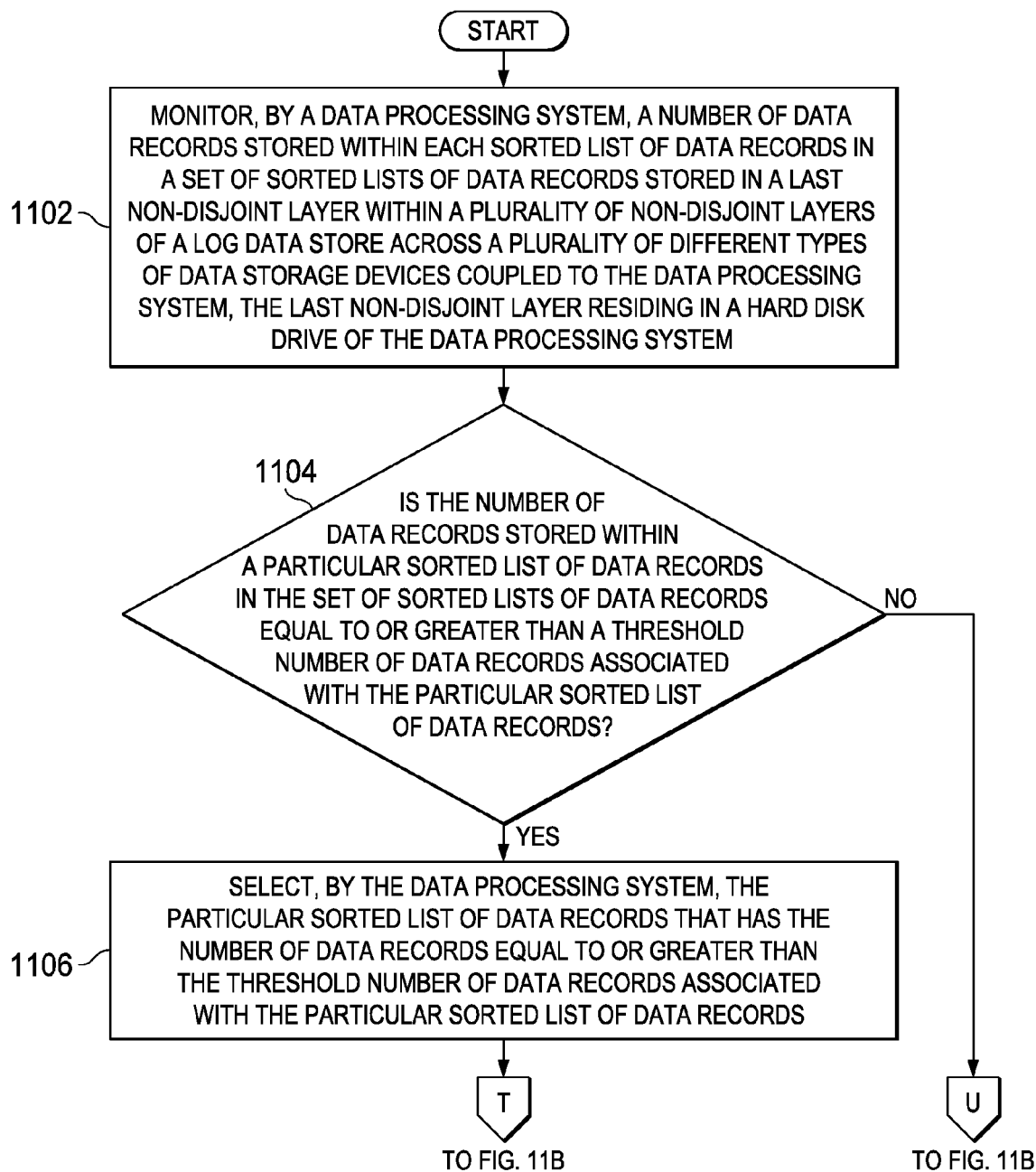

LOG DATA STORE THAT STORES DATA ACROSS A PLURALITY OF STORAGE DEVICES USING NON-DISJOINT LAYERS

BACKGROUND

1. Field

The disclosure relates generally to data storage and more specifically to storing data records within a log data store that includes a plurality of successive non-disjoint layers inserted across a plurality of different types of data storage devices coupled to a data processing system.

2. Description of the Related Art

With the ever increasing size and complexity of enterprise data processing systems, a need exists for more detailed application performance management. Due to the high data production rates of these large enterprise data processing systems, traditional database technology cannot sustain the required application performance. An alternative may be more lightweight and, thus, more performant key-value data stores. However, these key-value data stores tend to sacrifice read performance in order to obtain a desired write throughput by avoiding random disk access in favor of faster sequential accesses. With the advent of solid-state storage devices the boundary between sequential data accesses and random data accesses is now being blurred.

SUMMARY

According to one illustrative embodiment, a method for storing data records within a log data store is provided. A data processing system generates the log data store that stores data records within a plurality of successive non-disjoint layers inserted across a plurality of different types of data storage devices associated with the data processing system. The data processing system inserts a first non-disjoint layer of the plurality of successive non-disjoint layers within a main memory device of the data processing system; inserts a set of intermediate non-disjoint layers of the plurality of successive non-disjoint layers within a set of storage-class memory devices of the data processing system; and inserts a last non-disjoint layer of the plurality of successive non-disjoint layers within a hard disk drive of the data processing system. The data processing system increases a size of each successive non-disjoint layer in the plurality of successive non-disjoint layers exponentially by a predetermined factor value. The data processing system organizes the data records into the plurality of successive non-disjoint layers of the log data store inserted across the plurality of different types of data storage devices. Each successive non-disjoint layer in the plurality of successive non-disjoint layers includes a set of disjoint sorted lists of data records and each particular disjoint sorted list of data records in the set of disjoint sorted lists of data records corresponds to a particular key. According to other illustrative embodiments, a data processing system and a computer program product for storing data records within a log data store also are provided.

BRIEF DESCRIPTION OF THE SEVERAL VIEWS OF THE DRAWINGS

FIG. 1 is a diagram of a data processing system in which illustrative embodiments may be implemented;

FIG. 2 is a diagram illustrating an example of a log data store in accordance with an illustrative embodiment;

FIG. 3 is a diagram illustrating a merging and compaction process of a log data store in accordance with an illustrative embodiment;

FIG. 4 is a diagram illustrating a process to increase disk-merge bandwidth in a log data store in accordance with an illustrative embodiment;

FIGS. 5A-5B are a flowchart illustrating a process for generating a log data store across a plurality of different types of data storage devices coupled to a data processing system in accordance with an illustrative embodiment;

FIGS. 6A-6B are a flowchart illustrating a process for searching for data records in a log data store in accordance with an illustrative embodiment;

FIGS. 8A-8C are a flowchart illustrating a process for merging data records when a first layer of a log data store is full in accordance with an illustrative embodiment;

FIGS. 9A-9C are a flowchart illustrating a process for merging data records when a subsequent layer of a log data store is full in accordance with an illustrative embodiment;

FIGS. 10A-10C are a flowchart illustrating a process for increasing disk-merge bandwidth in a log data store in accordance with an illustrative embodiment; and FIGS. 11A-11B are a flowchart illustrating a process for compaction in a log data store in accordance with an illustrative embodiment.

DETAILED DESCRIPTION

Figure 5B:
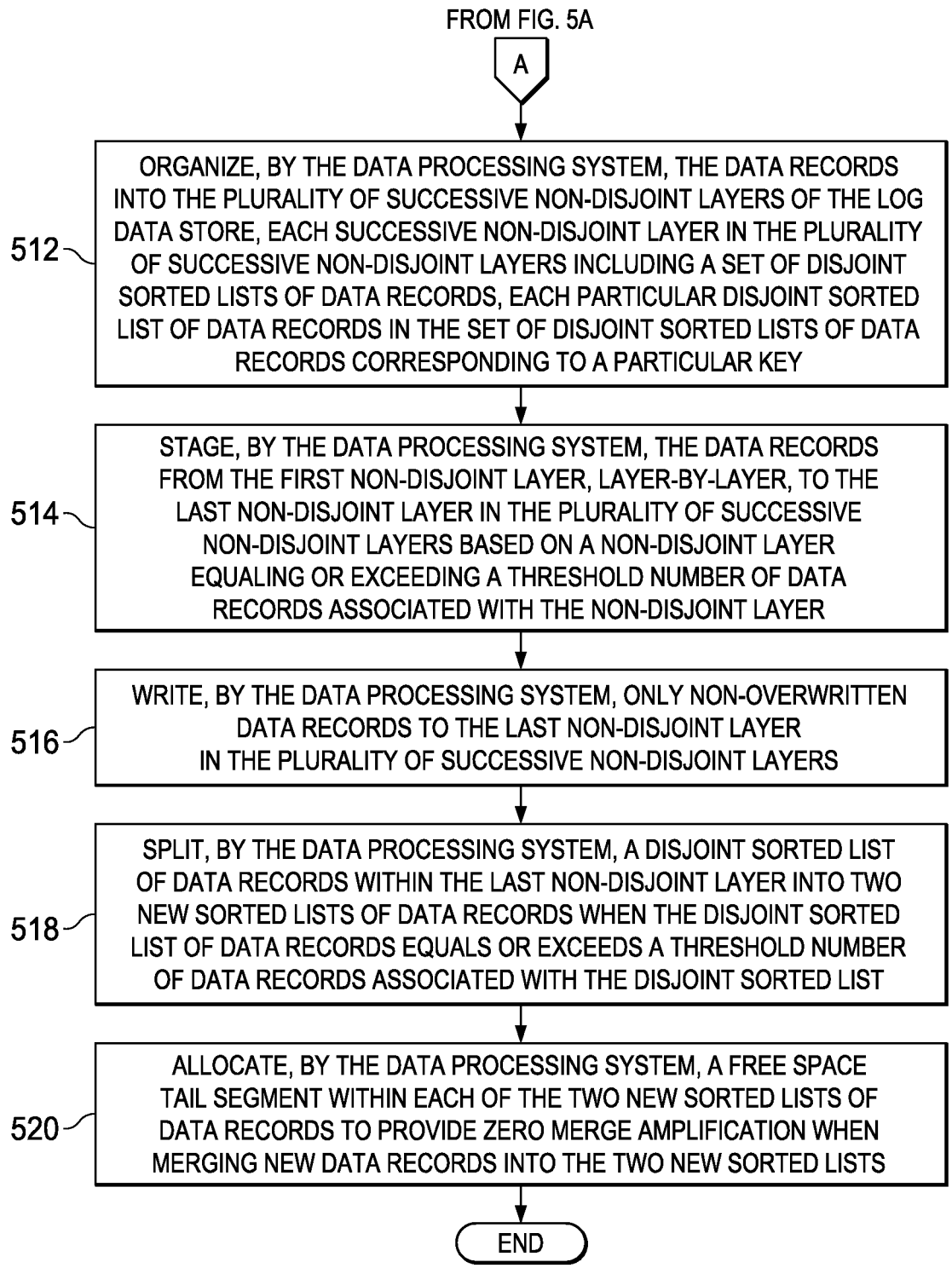

As will be appreciated by one skilled in the art, aspects of the illustrative embodiments may be embodied as a data processing system, method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, data processing systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a diagram of a data processing system in accordance with an illustrative embodiment. Data processing system 100 is an example of a computer device in which computer readable program code or instructions implementing processes of illustrative embodiments may be located. Data processing system 100 may be, for example, a server computer or a client computer connected to a network, such as a local area network (LAN), a wide area network (WAN), an intranet, an internet, or the Internet. In this illustrative example, data processing system 100 includes communications fabric 102, which provides communications between processor unit 104, memory 106, storage-class memory (SCM) 108, persistent storage 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106, storage-class memory 108, and persistent storage 110 are examples of computer readable storage devices 118. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium, such as a signal or carrier wave. Memory 106, in this example, may be a main memory device, such as a dynamic random access memory (DRAM), or any other suitable volatile or non-volatile storage device, of data processing system 100.

Storage-class memory 108 may be, for example, a phase change memory (PCM) and/or a solid-state drive (SSD). A phase change memory is a non-volatile solid-state data storage memory device employing phase change materials that change between two states, namely an amorphous state and a poly-crystalline state. A solid-state drive uses integrated circuit assemblies as memory to store data persistently. Storage-class memory 108 uses electronic interfaces compatible with memory 106 and persistent storage 110. Storage-class memory 108 has lower access time and less latency than persistent storage 110.

Persistent storage 110 may take various forms, depending on the particular implementation. For example, persistent storage 108 may contain one or more devices. For example, persistent storage 108 may be a magnetic hard disc drive (HDD), a flash memory, a rewritable optical disk, a rewritable magnetic tape drive, or some combination of the above. The media used by persistent storage 108 may be removable. For example, a removable hard disc drive may be used for persistent storage 108.

In this example, memory 106, storage-class memory 108, and persistent storage 110 comprise log data store 120. However, it should be noted that any number and type of data storage devices may comprise log data store 120. In other words, more or fewer data storage devices may comprise log data store 120. In addition, other types of data storage devices other than those illustrated in this example may comprise log data store 120. Log data store 120 is a data store that stores a plurality of data records in a log format within layers 122. The log format may be, for example, a circular data array format. The data records may represent any type of recorded data. For example, the data records may be associated with a monitoring application that receives a multitude of readings at a very rapid pace from thousands of sensors.

Layers 122 represent a plurality of successive non-disjoint (i.e., overlapping) layers of data records. Each successive non-disjoint layer may be, for example, ten times larger than the previous non-disjoint layer. Log data store 120 inserts one or more layers of layers 122 into each of memory 106, storage-class memory 108, and persistent storage 110. For example, log data store 120 may insert a first layer (e.g., layer 0) of layers 122 within memory 106; a set of one or more successive intermediate layers (e.g., layers 1 through k-1) of layers 122 within a set of one or more storage devices, such as a phase change memory and/or a solid-state drive, in storage-class memory 108; and a final layer (e.g., layer k) within persistent storage 110.

Each layer in layers 122 includes a set of one or more sorted lists of sorted lists 124. Data records 126 represent a plurality of data records and comprise sorted lists 124. Data records 126 include keys 128. Each data record in data records 126 includes a key that corresponds to that data record. Sorted lists 124 represent a collection of key/data record pairs that are sorted by the keys and are accessible by the keys. For example, each sorted list in sorted lists 124 corresponds to a particular key. In other words, all data records included in a particular sorted list correspond to the same key. Thus, a particular sorted list of data records is a disjoint or non-overlapping sorted list of data records within a particular layer of layers 122. However, it should be noted that data records within a sorted list of a particular layer of layers 122 may overlap with data records of another sorted list of a successive layer of layers 122. For example, the overlapping data records within the different sorted lists in the different layers may represent different versions of the same record or only represent delta changes to the same record.

Log data store 120 stages or moves a disjoint sorted list of data records corresponding to a particular key (i.e., a non-overlapping set of data records within a particular layer), from one non-disjoint layer to a next successive non-disjoint layer in layers 122 as a layer reaches or exceeds a threshold number of data records associated with that particular layer. In addition, log data store 120 may split a disjoint sorted list of data records into two new sorted lists when the disjoint sorted list reaches or exceeds a threshold number of data records associated with that particular sorted list. For example, log data store 120 may split a full sorted list in half. Further, log data store 120 may append a free space segment to an end or tail of each new sorted list. Thus, log data store 120 maintains a write-intensive data structure that supports fast read operations by staging data records from faster storage mediums to slower storage mediums using non-disjoint layers inserted across the different types of storage mediums.

Communications unit 112, in this example, provides for communication with other data processing systems and computing devices. Communications unit 112 may provide communications through the use of either or both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 100.

Input/output unit 114 allows for the input and output of data with other devices that may be connected to data processing system 100. For example, input/output unit 114 may provide a connection for user input through a keypad, a keyboard, a mouse, and/or some other suitable input device. Display 116 provides a mechanism to display information to a user. In addition, display 116 may provide touch screen capabilities.

Instructions for the operating system, applications, and/or programs may be located in storage devices 118, which are in communication with processor unit 104 through communications fabric 102. In this illustrative example, the instructions are in a functional form on persistent storage 110. These instructions may be loaded into memory 106 for running by processor unit 104. The processes of the different embodiments may be performed by processor unit 104 using computer implemented instructions, which may be located in a main memory, such as memory 106. These instructions are referred to as program code, computer usable program code, or computer readable program code that may be read and run by a processor in processor unit 104. The program code, in the different embodiments, may be embodied on different physical computer readable storage devices, such as memory 106, storage-class memory 108, or persistent storage 110.

Program code 130 is located in a functional form on computer readable media 132 that is selectively removable and may be loaded onto or transferred to data processing system 100 for running by processor unit 104. Program code 130 and computer readable media 132 form computer program product 134. In one example, computer readable media 132 may be computer readable storage media 136 or computer readable signal media 138. Computer readable storage media 136 may include, for example, an optical or magnetic disc that is inserted or placed into a drive or other device that is part of persistent storage 110 for transfer onto a storage device, such as a magnetic hard disc drive, that is part of persistent storage 110. Computer readable storage media 136 also may take the form of a persistent storage device, such as a hard drive, a thumb drive, or a flash memory that is connected to data processing system 100. In some instances, computer readable storage media 136 may not be removable from data processing system 100.

Alternatively, program code 130 may be transferred to data processing system 100 using computer readable signal media 138. Computer readable signal media 138 may be, for example, a propagated data signal containing program code 130. For example, computer readable signal media 138 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 130 may be downloaded over a network to persistent storage 110 from another device or data processing system through computer readable signal media 138 for use within data processing system 100. For instance, program code stored in a computer readable storage media in a server data processing system may be downloaded over a network from the server to data processing system 100. The data processing system providing program code 130 may be a server computer, a client computer, or some other device capable of storing and transmitting program code 130.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, storage-class memory 108, persistent storage 110, and computer readable storage media 136 are examples of physical computer readable storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that many data processing challenges are characterized not only by the large volume of data that has to be processed, but also by the high data production rate (i.e., high velocity). For example, in modern monitoring applications, many thousands of sensors produce a multitude of readings, which have to be stored at a high pace, but also have to be readily available for continuous data query processing. Examples of such monitoring applications may include traffic monitoring applications, smart grid applications, and applications that manage application performance. In application performance management, for example, hundreds to thousands of servers that are connected in an enterprise system will be monitored to determine bottlenecks, sources of errors, and inefficiencies that often stem from highly complex interactions of various software services. This requires the collection of monitoring data to enable the tracing of the path that individual transactions take through the system. The common denominator among these monitoring applications is the need for write-intensive data storage, such as key-value data stores. Current storage approaches either try to exploit the speed of memory-based solutions, thus, drastically limiting the amount of data that can be stored or try to use disk-based approaches and, thus, only allow sampling of required information to cope with the high velocity data production rate.

Building on the success of key-value data stores, illustrative embodiments utilize a new log data store approach to manage the high velocity data. A feature of illustrative embodiments is the efficient use of high-speed storage hardware, especially, modern storage-class memory technology, such as phase-change memory and/or solid-state drives. These new technologies have improved performance in comparison to traditional data storage hardware. However, classical data structures and algorithms cannot directly be applied managing high velocity data due to the different characteristics of these devices. Also, the high cost of these new storage technologies makes their exclusive use uneconomical in many cases. Therefore, hybrid storage approaches are being explored in both industry and academia, in which modern and traditional technologies are co-allocated to form a storage memory hierarchy. In contrast, illustrative embodiments are directed toward a new log data store instead of relational database systems by re-designing the log-structure of existing key-value data stores and database management systems.

In general, existing database log-structured techniques suffer from: 1) several random hard disk drive input/outputs for every data query; 2) sporadic merging operations; 3) high data merging and compaction amplification; 4) inability to handle skewed write operations; and 5) most log-structured techniques do not consider the advantageous features of modern hardware, such as solid-state drives for the problem at hand. Illustrative embodiments alleviate the expensive merging and compaction routine of existing log-structure techniques using a bounded solid-state drive footprint and at most a single random hard disk drive input/output for read operations at a fraction of the database size.

Illustrative embodiments introduce a data record staging mechanism using a novel log-structured data store that stores recent changes to a data record on a storage-class memory, such as a solid-state drive, and as the data ages, the data are pushed to a hard disk drive, while minimizing the read/write amplification for merging the data from the storage-class memory to the hard disk drive. In addition, illustrative embodiments ensure that all write operations on both the storage-class memory and the hard disk drive are sequential sorted lists of data records. Illustrative embodiments also may enable multi-version concurrency control (MVCC), since old versions of data records are retained. Further, multi-version concurrency control is considered as an efficient indexing method for write-intensive workloads.

The log data store of illustrative embodiments provides a bounded read latency in which, at most, one random hard disk drive input/output is required to read any data record. Furthermore, the log data store minimizes data record merge amplification using a storage-class memory-aware eviction and merge-policy by: 1) increasing disk-merge bandwidth by reconciling recent updates/deletes to data records; and 2) improving read performance by avoiding the copying of old outdated (i.e., overwritten) data record versions. The log data store also utilizes an amortize compaction algorithm and limits all write operations to sequential access on both the storage-class memory and the hard disk drive (e.g., a circular log array of data record writes). Moreover, the log data store provides a limited storage-class memory footprint, such as, for example, 10% of the log data store size if each successive layer is 10 times larger than its previous layer.

The log data store utilizes a fractal cascading or repeating pattern structure in which data records are stored in up to "k" number of non-disjoint layers. For example, the first set of non-disjoint layers (layer 0 through layer k-1) may reside on volatile main memory, such as, for example, a dynamic random access memory, and/or on non-volatile storage-class memory, such as, for example, a phase-change memory or a solid-state drive. The last non-disjoint layer (layer k) may reside on a persistent storage device, such as, for example, a magnetic hard disk drive or a magnetic tape drive.

The size of each successive layer increases exponentially by a predetermined factor value. For example, each successive layer may be ten times larger than its immediately preceding layer. This exponential increase in layer size bounds or limits the size of the first set of layers (layers 0 through k-1) and ultimately bounds the footprint of both the main memory and storage-class memory. For example, when successive layers are exponentially larger by a factor of 10, then the size of the first set of layers (layers 0 through k-1) is approximately 10% of the final layer (layer k). Lastly, within each non-disjoint layer, data records are organized by corresponding key into a set of one or more disjoint sorted lists. However, it should be noted that data records stored across the different successive layers may overlap. Thus, the log data store of illustrative embodiments provides a data storage structure that spans across a plurality of different types of data storage devices.

The log data store's fractal cascading structure provides a means for staging data records from a faster data storage medium, such as a main memory, to a slower data storage medium, such as a hard disk drive. The log data store starts by batching unsorted data records in a first layer (layer 0), which may be located on a main memory device, for example. Once the first layer is full (i.e., reached or exceeded a threshold number of data records associated with that first layer), then the log data store sorts the data records in that first layer by corresponding keys into a set of one or more disjoint sorted lists of data records. Afterward, the log data store writes the set of disjoint sorted lists into the next successive layer (layer 1), which may be located on a phase-change memory, for example. Subsequently, once the second layer (layer 1) is full, then the log data store moves one disjoint sorted list at a time to the next successive layer (layer 2), which may be located on a solid-state drive, for example. Thus, as non-disjoint successive layers are filled with data records, the log data store pushes their respective data records to the next successive layer. As a result, the log data store stages data records, layer-by-layer, through the log data store's storage hierarchy until the data records reach the lowest or last layer (layer k), which may be located on a hard disk drive or potentially on a magnetic tape drive.

Thus, illustrative embodiments provide a method, data processing system, and computer program product for storing data records within a log data store. A data processing system generates the log data store that stores data records within a plurality of successive non-disjoint layers inserted across a plurality of different types of data storage devices associated with the data processing system. The data processing system inserts a first non-disjoint layer of the plurality of successive non-disjoint layers within a main memory device of the data processing system; inserts a set of intermediate non-disjoint layers of the plurality of successive non-disjoint layers within a set of storage-class memory devices of the data processing system; and inserts a last non-disjoint layer of the plurality of successive non-disjoint layers within a hard disk drive of the data processing system. The data processing system increases a size of each successive non-disjoint layer in the plurality of successive non-disjoint layers exponentially by a predetermined factor value. The data processing system organizes the data records into the plurality of successive non-disjoint layers of the log data store inserted across the plurality of different types of data storage devices. Each successive non-disjoint layer in the plurality of successive non-disjoint layers includes a set of disjoint sorted lists of data records and each particular disjoint sorted list of data records in the set of disjoint sorted lists of data records corresponds to a particular key.

With reference now to FIG. 2, a diagram illustrating an example of a log data store is depicted in accordance with an illustrative embodiment. Log data store 200 may be implemented in a data processing system, such as data processing system 100 in FIG. 1, for example. Log data store 200 may be, for example, log data store 120 in FIG. 1.

Log data store 200 includes non-disjoint layers 202. Non-disjoint layers 202 are a plurality of successive overlapping layers of data records inserted into a plurality of different types of data storage devices. Non-disjoint layers 202 may be, for example, layers 122 in FIG. 1. Non-disjoint layers 202 include layer 0 204, layer 1 206, layer 2 208, layer k-1 210, and layer k 212. Layer 0 204 is a first non-disjoint layer. Layer 1 206 through layer k-1 210 are successive intermediate non-disjoint layers. Layer k 212 is a final or last non-disjoint layer.

Log data store 200 utilizes main memory 214, phase-change memory 216, solid-state drive 218, and hard disk drive 220. In other words, illustrative embodiments locate log data store 200 across main memory 214, phase-change memory 216, solid-state drive 218, and hard disk drive 220. Main memory 214 may be, for example, memory 106 in FIG. 1. Phase-change memory 216 and solid-state drive 218 may be, for example, storage class memory 108 in FIG. 1. It should be noted that phase-change memory 216 is optional in this example. Hard disk drive 220 may be, for example, a magnetic hard disk storage device represented by persistent storage 110 in FIG. 1.

In this example, main memory 214 hosts layer 0 204; phase-change memory 216 hosts layer 1 206; solid-state drive 218 hosts layer 2 208 through layer k-1 210; and hard disk drive 220 hosts layer k 212. Log data store 200 stores unsorted data records 222 in layer 0 204, updatable data records 224 in layer 1 206, data records 226 in layers 2 208 through k-1 210, and data records 228 in layer k 212. Log data store 200 stores unsorted data records 222, updatable data records 224, and data records 226-228 in blocks of sorted lists, such as sorted list 230, within the different successive layers of non-disjoint layers 202. The blocks of sorted lists within the different successive layers are represented by disjoint sorted lists within each layer 232. Disjoint sorted lists within each layer 232 represent sets of non-overlapping sorted lists of data records sorted by key within each particular non-disjoint layer of log data store 200.

Log data store 200 supports read operations 234 (i.e., select data record queries) and the write operations 236 (i.e., insert, update, and delete data record queries). Log data store 200 may store and retain all versions of and changes to a data record and function as a multi-version database. Write operations 236 add unsorted data records 222 to layer 0 204 (i.e., the first layer in non-disjoint layers 202) within main memory 214 as append-only. Alternatively, write operations 236 may perform in-place data record updates to updatable data records 224 in layer 1 206 (i.e., the next successive layer in non-disjoint layers 202) in fast addressable phase-change memory 216. For example, log data store 200 may place frequently updated data records in non-volatile layer 1 206 as opposed to volatile layer 0 204. However, including a layer that supports in-place data record updates is optional and not essential to the functioning of log data store 200. Also, it should be noted that write operations 236 may simply store delta changes to data records. By only capturing the delta changes to a data record and not storing the entire data record for each captured delta change, log data store 200 supports blind-writes. In fact, using blind-writes helps to avoid random data record accesses, which need to retrieve all the old values or versions of a data record. As a result, blind writes help to implement writes as pure sequential data accesses and not as random data accesses.

Since log data store 200 first places a data record on layer 0 204 and slowly moves the data record through the different layers of non-disjoint layers 202 and also retains previous versions of the data record, then it is necessary for log data store 200 to reconcile all the different versions of the data record stored on the different layers to reconstruct a complete latest version (i.e., current version) of the data record on the final or last layer (i.e., layer k). Given that only the final layer resides on hard disk drive 220, it is easy to show that read operations 234 only require one hard disk drive 220 random data record access to retrieve a current version of a data record. In practice, log data store 200 does not need to examine all layers of non-disjoint layers 202. Existing techniques based on data filters, such as a Bloom filter, may quickly filter out one or more layers that do not include the particular data record of interest without any further examination by log data store 200. A Bloom filter is a data structure that is used to test whether a data element is a member of a set. Illustrative embodiments may insert a Bloom filter within each non-disjoint layer, for example.

Also, log data store 200 only accesses one sorted list, such as sorted list 230, within each layer because the set of sorted lists within each layer is disjoint (i.e., non-overlapping). Log data store 200 may utilize, for example, standard indexing techniques to identify different sorted lists that have overlapping data records (i.e., different versions of the same data record) in different successive layers of non-disjoint layers 202 during read operations 236. Since log data store 200 sequentially writes data records into a contiguous block within a disjoint sorted list, then accessing a single disjoint sorted list incurs at most one hard disk drive random input/output. It should be noted that sequential writes may not result in contiguous blocks on storage-class memory, such as phase-change memory 216 or solid-state drive 218, because random and sequential input/outputs on a storage-class memory have similar speed. In addition, if log data store 200 did not permit blind-writes, then only the first layer (layer 0 204), which would contain the desired data record, would need to be accessed.

With reference now to FIG. 3, a diagram illustrating a merging and compaction process of a log data store is depicted in accordance with an illustrative embodiment. Log data store merging and compaction process 300 may be implemented in a data processing system, such as data processing system 100 in FIG. 1, for example. The log data store may be, for example, log data store 200 in FIG. 2.

Log data store merging and compaction process 300 utilizes solid-state drive 302 and hard disk drive 304. Solid-state drive 302 may be, for example, solid-state drive 218 in FIG. 2. Hard disk drive 304 may be, for example, hard disk drive 220 in FIG. 2.

In this example, log data store merging and compaction process 300 includes zero merge amplification step 306, compaction step 308, and splitting and amortized compaction step 310. However, it should be noted that log data store merging and compaction process 300 may include more or fewer steps than illustrated. For example, two or more steps may be combined into one step or one step may be split into two or more steps. Also in this example, solid-state drive 302 hosts layer k-1 312, such as layer k-1 210 in FIG. 2, and hard disk drive 304 hosts layer k 314, such as layer k 212 in FIG. 2.

Both layer k-1 312 and layer k 314 include a set of disjoint (i.e., non-overlapping) sorted lists of data records, such as disjoint sorted lists 316. Disjoint sorted lists 316 may be, for example, disjoint sorted lists within each layer 232 in FIG. 2. Further, each disjoint sorted list includes a set of non-disjoint (i.e., overlapping) sorted sub-lists of data records, such as set of non-disjoint sorted sub-list 318.

In this example, layer k-1 312 on solid-state drive 302 stores disjoint sorted list 322 and layer k 314 on hard disk drive 304 stores disjoint sorted lists 324, 326, 328, and 330. Also in this example, disjoint sorted lists 324, 326, 328, and 330 are sub-lists of disjoint sorted list 322. For example, disjoint sorted list 322 may store data records having values ranging from 1-100. Disjoint sorted list 324 may be a sub-list of those values ranging from 1-100 by only storing values ranging from 1-10. Similarly, disjoint sorted list 326 may only store values ranging from 11-30, disjoint sorted list 328 may only store values ranging from 31-50, and disjoint sorted list 330 may only store values ranging from 51-100. Thus, disjoint sorted lists 324, 326, 328, and 330 in layer k 314 are associated with disjoint sorted list 322 in layer k-1 312. Log data store merging and compaction process 300 splits disjoint sorted list 322 into a plurality of different sets of data records via, for example, sorted list chunking 320, and merges the different chunks of data records with overlapping and corresponding data records within disjoint sorted lists 324, 326, 328, and 330.

The process of merging data records refers to combining a set of sorted lists to produce a new set of sorted lists. Existing log-structured techniques merge a sorted list from one layer with all overlapping sorted lists in subsequent layers. For example, suppose data records in a particular sorted list on a particular layer overlap with data records in a set of one or more sorted lists on a subsequent layer. The existing merging process requires reading all the sorted lists on both layers, merging the results, re-sorting the data records, and then writing the resulting sorted lists. Consequently, moving a single sorted list to the next layer using existing techniques results in amplification of read/write operations.

Zero merge amplification step 306 avoids this highly amplified merging of existing techniques by relaxing the sorted list criteria, while maintaining at maximum one hard disk drive 304 random input/output read query. For example, log data store merging and compaction process 300 defines a relaxed sorted list of data records on hard disk drive 304 as a set of non-disjoint sorted sub-lists of the data records and co-allocates all the sub-lists in a contiguous block on hard disk drive 304. In addition, log data store merging and compaction process 300 also modifies the merging process of layer k 314 on hard disk drive 304. For example, when a particular sorted list in layer k-1 312 needs to be moved to layer k 314, log data store merging and compaction process 300 first identifies all the overlapping sorted lists in both layers, but does not actually read their content. Instead, log data store merging and compaction process 300 splits the particular sorted list to be moved to layer k 314 into a set of disjoint sorted sub-lists that overlaps with at most one of the sub-lists in layer k 314.

Once sorted list chunking 320 constructs valid chunks of sorted sub-lists, then zero merge amplification step 306 appends each sorted sub-list to its corresponding sorted list in the next layer. Hence, log data store merging and compaction process 300 achieves a read/write merge amplification of zero. After appending several chunks of sorted sub-lists into the sorted list in the next level, the sorted list eventually becomes filled with data records resulting in the triggering of compaction step 308.

Compaction step 308 reconciles sorted sub-lists of data records corresponding to a particular key and delta changes associated with the data records. Since log data store merging and compaction process 300 only stores delta changes to a data record, then read queries for that data record are forced to read all the delta changes to the data record and reconstruct the latest version of that data record. Compaction step 308 is responsible for combining both sorted sub-lists and data record delta changes, which are necessary to further improve read operations and eliminate unneeded historic versions of the data record. It should be noted that historic data may be extracted and stored separately. Currently, the process of compaction occurs during the merging process. However, log data store merging and compaction process 300 delays and amortizes the compaction process (mostly for layer k 314 on hard disk drive 304) because zero merge amplification step 306 relies on sorted list chunking 320 and append-only write operations with no reads.

Once a sorted list, which consists of a set of non-disjoint sorted sub-lists, is filled, then splitting and amortized compaction step 310 reads and sorts all sub-lists, reconciles all data record delta changes, deletes the data record delta changes, and splits the sorted data into two new sorted lists, such as split in two sorted lists 332. For example, splitting and amortized compaction step 310 splits sorted list 324 in layer k 314 into sorted list 324(a) and 324(b). A tail portion or segment at an end of each sorted list is allocated as free space for future merge operations, such as pre-allocated free space tail 334. The size of free space tail segment is a tunable parameter that may be tuned based on the "hotness" of a sorted list. Alternatively, log data store merging and compaction process 300 may allocate a predetermined amount, such as, for example, 50% of an entire sorted list, as free space. It should be noted that log data store merging and compaction process 300 amortizes compaction over a plurality of merging operations and is triggered when a sorted list reaches or exceeds a threshold number of data records associated with the sorted list.

With reference now to FIG. 4, a diagram illustrating a process to increase disk-merge bandwidth in a log data store is depicted in accordance with an illustrative embodiment. Process to increase disk-merge bandwidth 400 may be implemented in a log data store of a data processing system, such as log data store 120 of data processing system 100 in FIG. 1. Process to increase disk-merge bandwidth 400 utilizes solid-state drive 402 and hard disk drive 404. Solid-state drive 402 may be, for example, solid-state drive 302 in FIG. 3 and hard disk drive 404 may be, for example, hard disk drive 304 in FIG. 3.

In this example, process to increase disk-merge bandwidth 400 includes lookback step 406 and differential write step 408. However, it should be noted that process to increase disk-merge bandwidth 400 may include more or fewer steps than illustrated. For example, steps may be combined into a single step or steps may be split into two or more steps. Also in this example, solid-state drive 402 hosts layer 1 410, layer k-2 412, and layer k-1 414 and hard disk drive 404 hosts layer k 416. It should be noted that solid-state drive 402 may host more layers than shown. Also, it should be noted that layer k-1 414 is the immediately preceding layer to layer k 416 and that layer k-2 412 is the immediately preceding layer to layer k-1 414 in this example. Further, layer 1 410, layer k-2 412, layer k-1 414 and layer k 416 include disjoint sorted list 418.

Process to increase disk-merge bandwidth 400 improves the data record merging bandwidth of the log data store using the fast random data access property of solid-state drive 402. During the data record merge process when moving a sorted list, such as disjoint sorted list 418, from a layer on a faster storage medium, such as layer k-1 414 on solid-state drive 402, to a successive layer on a slower storage medium, such as layer k 416 on hard disk drive 404, process to increase disk-merge bandwidth 400 modifies the data record chunking process. Process to increase disk-merge bandwidth 400 constructs the chunks as illustrated in sorted list chunking 320 in FIG. 3, however, process to increase disk-merge bandwidth 400 invalidates and removes within each chunk any data record that has already been overwritten and stored in a previous layer. For example, newer version 420 of a data record in disjoint sorted list 418 in layer k-2 412. The overwritten version of the data record is in disjoint sorted list 418 on layer k-1 414. The removal of the overwritten data record reduces the size of each chunk, such as, for example, shown in set difference 422. As a result, process to increase disk-merge bandwidth 400 only transfers a decreased amount of data from the faster storage medium (i.e., solid-state drive 402) to the slower storage medium (i.e., hard disk drive 404).

In general, the removal process of overwritten data records may take on two extreme positions: 1) no invalidation and removal of overwritten data records; or 2) check all the preceding layers for a newer version of a data record. Consequently, process to increase disk-merge bandwidth 400 determines a balance between the cost of additional random read operations to find newer versions of a data record during lookback step 406 versus the transferring cost of data records from the faster storage medium to the slower storage medium during differential write step 408. In addition, process to increase disk-merge bandwidth 400 also considers the current load on the faster storage medium for answering data record queries. As a result, process to increase disk-merge bandwidth 400 considers the trade-offs between these conflicting criteria.

With reference now to FIGS. 5A-5B, a flowchart illustrating a process for generating a log data store across a plurality of different types of data storage devices coupled to a data processing system is shown in accordance with an illustrative embodiment. The process shown in FIGS. 5A-5B may be implemented in a data processing system, such as, for example, data processing system 100 in FIG. 1.

The process begins when the data processing system generates a log data store that stores data records within a plurality of successive non-disjoint layers inserted across a plurality of different types of data storage devices coupled to the data processing system (step 502). The log data store that stores the data records within the plurality of successive non-disjoint layers may be, for example, log data store 120 that stores data records 126 within layers 122 in FIG. 1. The plurality of types of data storage device coupled to the data processing system may be, for example, memory 106, storage-class memory 108, and persistent storage 110 in FIG. 1.

Afterward, the data processing system inserts a first non-disjoint layer of the plurality of successive non-disjoint layers within a main memory device of the data processing system (step 504). For example, layer 0 204 in main memory 214 in FIG. 2. In addition, the data processing system inserts a set of intermediate non-disjoint layers of the plurality of successive non-disjoint layers within a set of storage-class memory devices of the data processing system (step 506). For example, layer 1 206, layer 2 208, and layer k-1 210 in phase-change memory 216 and solid-state drive 218 in FIG. 2. Further, the data processing system inserts a last non-disjoint layer of the plurality of successive non-disjoint layers within a hard disk drive or a magnetic tape drive of the data processing system (step 508). For example, layer k 212 in hard disk drive 220 in FIG. 2.

Furthermore, the data processing system increases a size of each successive non-disjoint layer in the plurality of successive non-disjoint layers exponentially by a predetermined factor value, such as, for example, 10 (step 510). The data processing system also organizes the data records into the plurality of successive non-disjoint layers of the log data store (step 512). Each successive non-disjoint layer in the plurality of successive non-disjoint layers including a set of disjoint sorted lists of data records, such as disjoint sorted lists within each layer 232 in FIG. 2. Each particular disjoint sorted list of data records in the set of disjoint sorted lists of data records corresponding to a particular key, such as a particular key within keys 128 in FIG. 1.

Moreover, the data processing system stages the data records from the first non-disjoint layer, layer-by-layer, to the last non-disjoint layer in the plurality of successive non-disjoint layers based on a non-disjoint layer equaling or exceeding a threshold number of data records associated with the non-disjoint layer (step 514). The data processing system only writes non-overwritten data records to the last non-disjoint layer in the plurality of successive non-disjoint layers, such as, for example, set difference 422 in differential write step 408 in FIG. 4 (step 516). Also, the data processing system splits a disjoint sorted list of data records within the last non-disjoint layer into two new sorted lists of data records, such as split in two sorted lists 332 in FIG. 3, when the disjoint sorted list of data records equals or exceeds a threshold number of data records associated with the disjoint sorted list (step 518). In addition, the data processing system allocates a free space tail segment within each of the two new sorted lists of data records, such as pre-allocated free space tail 334 in FIG. 3, to provide zero merge amplification when merging new data records into the two new sorted lists (step 520). Thereafter, the process terminates.

Figure 6B:
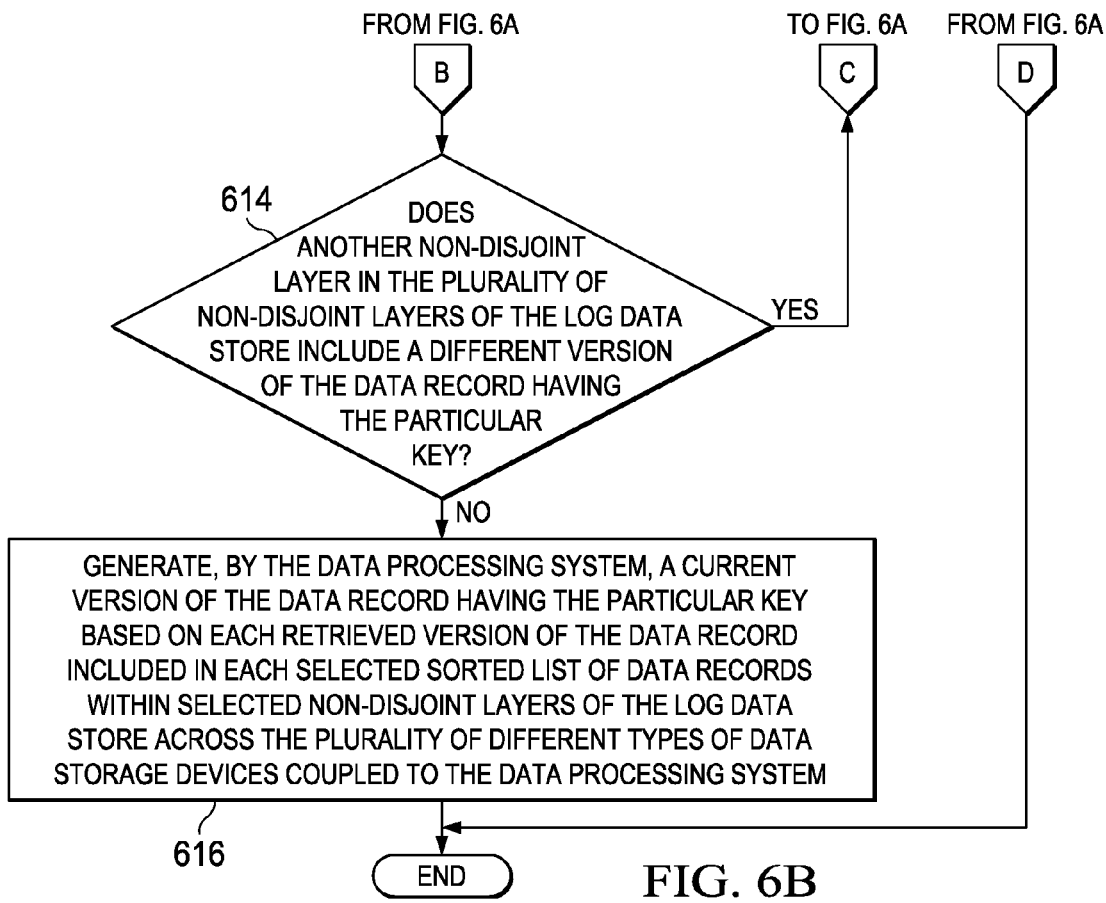

With reference now to FIGS. 6A-6B, a flowchart illustrating a process for searching for data records in a log data store is shown in accordance with an illustrative embodiment. The process shown in FIGS. 6A-6B may be implemented in a data processing system, such as, for example, data processing system 100 in FIG. 1.

The process begins when the data processing system receives an input to search for different versions of a data record having a particular key within a plurality of non-disjoint layers of a log data store across a plurality of different types of data storage devices coupled to the data processing system (step 602). Afterward, the data processing system searches each non-disjoint layer in the plurality of non-disjoint layers of the log data store for the data record having the particular key (step 604). Subsequently, the data processing system makes a determination as to whether a non-disjoint layer in the plurality of non-disjoint layers of the log data store includes a version of the data record having the particular key (step 606).

If the data processing system determines that a non-disjoint layer in the plurality of non-disjoint layers of the log data store does not include a version of the data record having the particular key, no output of step 606, then the process terminates thereafter. If the data processing system determines that a non-disjoint layer in the plurality of non-disjoint layers of the log data store does include a version of the data record having the particular key, yes output of step 606, then the data processing system selects the non-disjoint layer including the version of the data record having the particular key within the plurality of non-disjoint layers of the log data store (step 608). In addition, the data processing system selects a sorted list of data records within the selected non-disjoint layer including the version of the data record having the particular key (step 610).

Then, the data processing system retrieves the version of the data record having the particular key from the selected sorted list of data records within the selected non-disjoint layer (step 612). Afterward, the data processing system makes a determination as to whether another non-disjoint layer in the plurality of non-disjoint layers of the log data store includes a different version of the data record having the particular key (step 614). If the data processing system determines that another non-disjoint layer in the plurality of non-disjoint layers of the log data store does include a different version of the data record having the particular key, yes output of step 614, then the process returns to step 608 where the data processing system selects the other non-disjoint layer that includes the different version of the data record. If the data processing system determines that no other non-disjoint layer in the plurality of non-disjoint layers of the log data store includes a different version of the data record having the particular key, no output of step 614, then the data processing system generates a current version of the data record having the particular key based on each retrieved version of the data record included in each selected sorted list of data records within selected non-disjoint layers of the log data store across the plurality of different types of data storage devices coupled to the data processing system (step 616). Thereafter, the process terminates.

Figure 7:
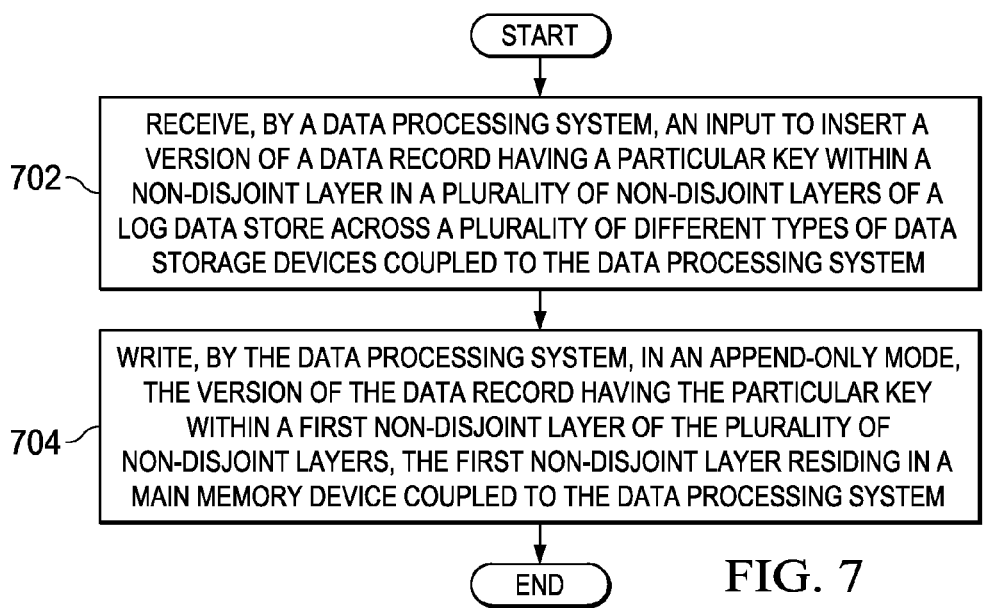
FIG. 7 is a flowchart illustrating a process for writing data records to a log data store in accordance with an illustrative embodiment.

With reference now to FIG. 7, a flowchart illustrating a process for writing data records to a log data store is shown in accordance with an illustrative embodiment. The process shown in FIG. 7 may be implemented in a data processing system, such as, for example, data processing system 100 in FIG. 1.

The process begins when the data processing system receives an input to insert a version of a data record having a particular key within a non-disjoint layer in a plurality of non-disjoint layers of a log data store across a plurality of different types of data storage devices coupled to the data processing system (step 702). Afterward, the data processing system writes, in an append-only mode, the version of the data record having the particular key within a first non-disjoint layer of the plurality of non-disjoint layers, the first non-disjoint layer residing in a main memory device coupled to the data processing system (step 704). Thereafter, the process terminates.

Figure 8C:
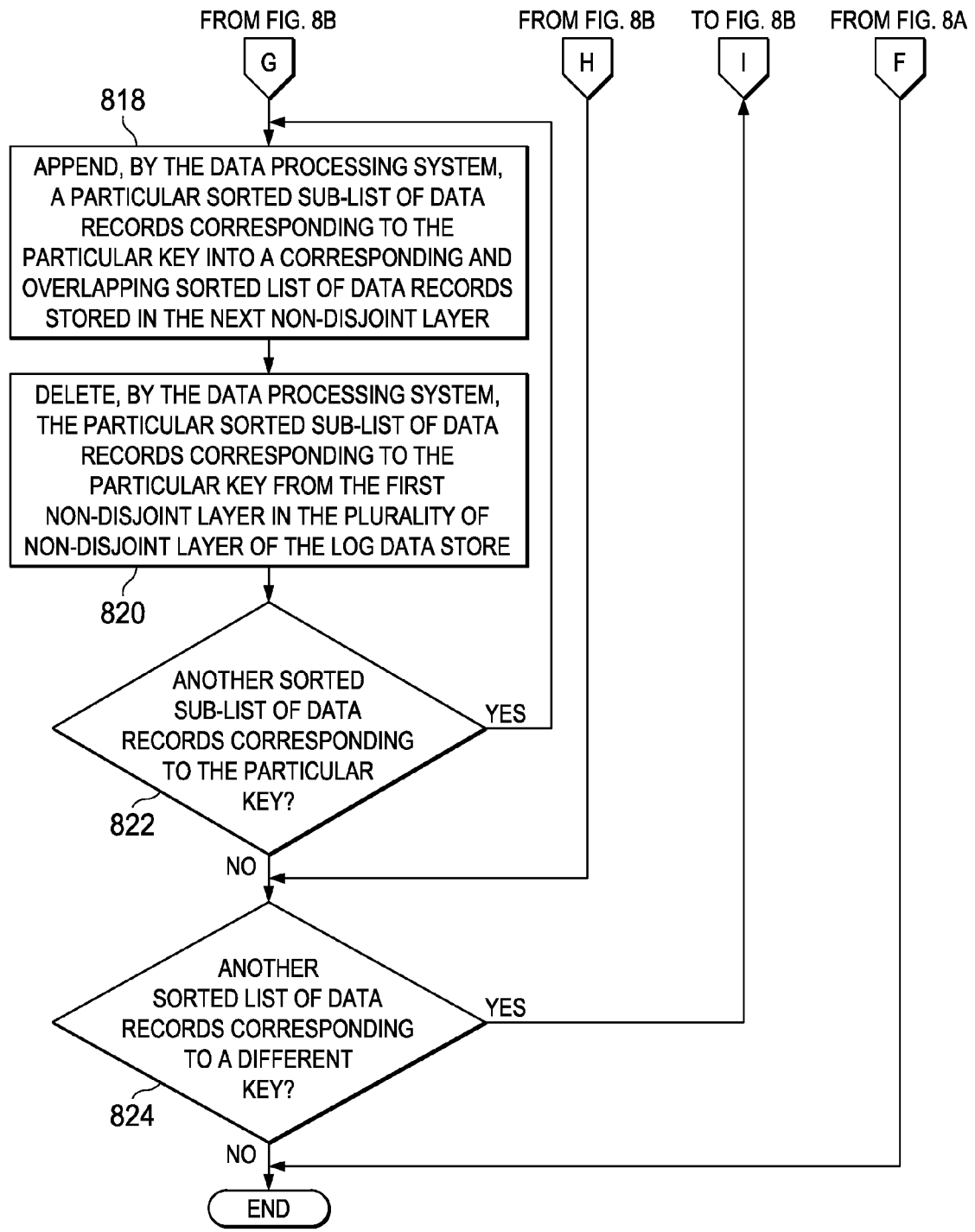

With reference now to FIGS. 8A-8C, a flowchart illustrating a process for merging data records when a first layer of a log data store is full is shown in accordance with an illustrative embodiment. The process shown in FIGS. 8A-8C may be implemented in a data processing system, such as, for example, data processing system 100 in FIG. 1.

The process begins when the data processing system monitors a number of data records stored within a first non-disjoint layer in a plurality of non-disjoint layers of a log data store across a plurality of different types of data storage devices coupled to the data processing system (step 802). The first non-disjoint layer resides in a main memory device of the data processing system, for example. The data processing system makes a determination as to whether the number of data records stored within the first non-disjoint layer in the plurality of non-disjoint layers of the log data store is equal to or greater than a threshold number of data records associated with the first non-disjoint layer (step 804). If the data processing system determines that the number of data records stored within the first non-disjoint layer in the plurality of non-disjoint layers of the log data store is not equal to or greater than the threshold number of data records associated with the first non-disjoint layer, no output of step 804, then the process terminates thereafter. If the data processing system determines that the number of data records stored within the first non-disjoint layer in the plurality of non-disjoint layers of the log data store is equal to or greater than the threshold number of data records associated with the first non-disjoint layer, yes output of step 804, then the data processing system reads each data record in the number of data records stored within the first non-disjoint layer in the plurality of non-disjoint layers of the log data store to determine a key corresponding to a respective data record in the number of data records (step 806).

Afterward, the data processing system sorts each of the number of data records stored within the first non-disjoint layer based on the key corresponding to each respective data record (step 808). In addition, the data processing system generates a sorted list of data records for each different key from the number of data records stored within the first non-disjoint layer (step 810). Then, the data processing system selects a sorted list of data records corresponding to a particular key (step 812).

The data processing system makes a determination as to whether a set of data records within the selected sorted list of data records corresponding to the particular key overlaps with data records within a set of sorted lists of data records stored in a next non-disjoint layer in the plurality of non-disjoint layers of the log data store (step 814). If the data processing system determines that a set of data records within the selected sorted list of data records corresponding to the particular key does overlap with data records within a set of sorted lists of data records stored in a next non-disjoint layer in the plurality of non-disjoint layers of the log data store, yes output of step 814, then the data processing system divides the selected sorted list of data records corresponding to the particular key into a set of sorted sub-lists of data records corresponding to the particular key based on a boundary of each set of data records within the set of sorted lists of data records stored in the next non-disjoint layer that overlaps with one or more data records in the selected sorted list of data records (step 816). The set of sorted sub-lists of data records corresponding to the particular key may be, for example, set of non-disjoint sorted sub-list 318 in FIG. 3.

Subsequently, the data processing system appends a particular sorted sub-list of data records corresponding to the particular key into a corresponding and overlapping sorted list of data records stored in the next non-disjoint layer (step 818). The data processing system also deletes the particular sorted sub-list of data records corresponding to the particular key from the first non-disjoint layer in the plurality of non-disjoint layer of the log data store (step 820). Further, the data processing system makes a determination as to whether another sorted sub-list of data records corresponding to the particular key exists (step 822). If the data processing system determines that another sorted sub-list of data records corresponding to the particular key does exist, yes output of step 822, then the process returns to step 818 where the data processing system appends the other sorted sub-list into a corresponding and overlapping sorted list in the next non-disjoint layer. If the data processing system determines that no other sorted sub-list of data records corresponding to the particular key exists, no output of step 822, then the data processing system makes a determination as to whether another sorted list of data records corresponding to a different key exists (step 824).

If the data processing system determines that another sorted list of data records corresponding to a different key does exist, yes output of step 824, then the process returns to step 812 where the data processing system selects the other sorted list of data records corresponding to the different key. If the data processing system determines that no other sorted list of data records exists, no output of step 824, then the process terminates thereafter. Returning again to step 814, if the data processing system determines that no set of data records within the selected sorted list of data records corresponding to the particular key overlaps with data records within a set of sorted lists of data records stored in a next non-disjoint layer in the plurality of non-disjoint layers of the log data store, no output of step 814, then the data processing system appends the selected sorted list of data records corresponding to the particular key to the next non-disjoint layer in the plurality of non-disjoint layers of the log data store and deletes the selected sorted list from the first non-disjoint layer (step 826). Thereafter, the process returns to step 824 where the data processing system determines whether another sorted list of data records corresponding to a different key exists.

Figure 9C:
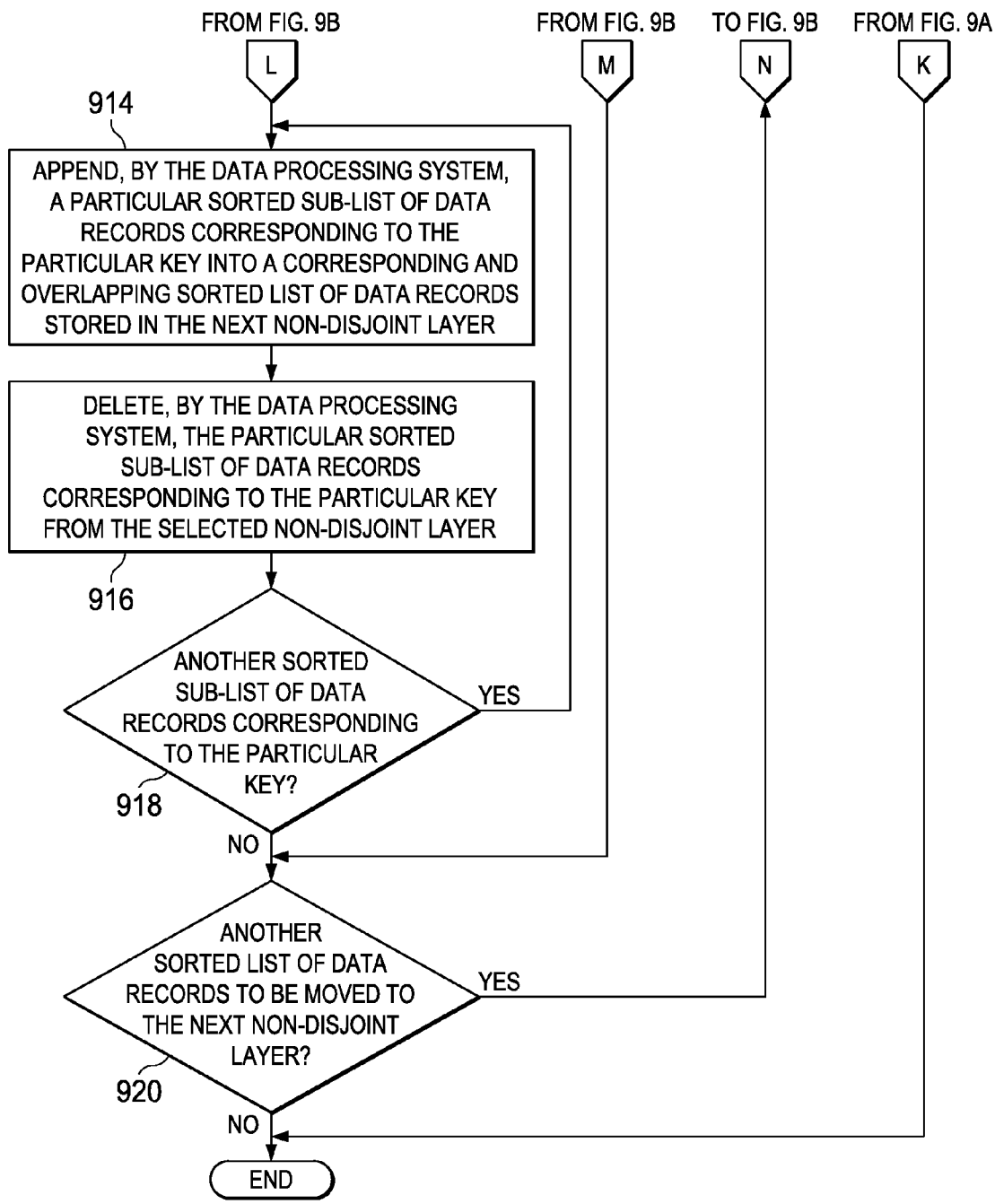

With reference now to FIGS. 9A-9C, a flowchart illustrating a process for merging data records when a subsequent layer of a log data store is full is shown in accordance with an illustrative embodiment. The process shown in FIGS. 9A-9C may be implemented in a data processing system, such as, for example, data processing system 100 in FIG. 1.

The process begins when the data processing system monitors a number of data records stored within each non-disjoint layer in a set of non-disjoint layers within a plurality of non-disjoint layers of a log data store across a plurality of different types of data storage devices coupled to the data processing system (step 902). The set of non-disjoint layers resides in a storage-class memory device of the data processing system, for example. The data processing system makes a determination as to whether the number of data records stored within a particular non-disjoint layer in the set of non-disjoint layers is equal to or greater than a threshold number of data records associated with the particular non-disjoint layer (step 904).

If the data processing system determines that the number of data records stored within a particular non-disjoint layer in the set of non-disjoint layers is not equal to or greater than the threshold number of data records associated with the particular non-disjoint layer, no output of step 904, then the process terminates thereafter. If the data processing system determines that the number of data records stored within a particular non-disjoint layer in the set of non-disjoint layers is equal to or greater than the threshold number of data records associated with the particular non-disjoint layer, yes output of step 904, then the data processing system selects the particular non-disjoint layer that has the number of data records equal to or greater than the threshold number of data records associated with the particular non-disjoint layer (step 906). In addition, the data processing system selects a sorted list of data records corresponding to a particular key within the selected non-disjoint layer to be moved to a next non-disjoint layer of the log data store (step 908).

Afterward, the data processing system makes a determination as to whether a set of data records within the selected sorted list of data records corresponding to the particular key overlaps with data records within a set of sorted lists of data records stored in the next non-disjoint layer (step 910). If the data processing system determines that a set of data records within the selected sorted list of data records corresponding to the particular key does overlap with data records within a set of sorted lists of data records stored in the next non-disjoint layer, yes output of step 910, then the data processing system divides the selected sorted list of data records corresponding to the particular key into a set of sorted sub-lists of data records corresponding to the particular key based on a boundary of each set of data records within the set of sorted lists of data records stored in the next non-disjoint layer that overlaps with one or more data records in the selected sorted list of data records (step 912). Subsequently, the data processing system appends a particular sorted sub-list of data records corresponding to the particular key into a corresponding and overlapping sorted list of data records stored in the next non-disjoint layer (step 914). The data processing system also deletes the particular sorted sub-list of data records corresponding to the particular key from the selected non-disjoint layer (step 916).

In addition, the data processing system makes a determination as to whether another sorted sub-list of data records corresponding to the particular key exists (step 918). If the data processing system determines that another sorted sub-list of data records corresponding to the particular key does exist, yes output of step 918, then the process returns to step 914 where the data processing system appends the other sorted sub-list of data records corresponding to the particular key into a corresponding and overlapping sorted list of data records stored in the next non-disjoint layer. If the data processing system determines that no other sorted sub-list of data records corresponding to the particular key exists, no output of step 918, then the data processing system makes a determination as to whether another sorted list of data records is to be moved to the next non-disjoint layer (step 920).

If the data processing system determines that another sorted list of data records is to be moved to the next non-disjoint layer, yes output of step 920, then the process returns to step 908 where the data processing system selects the other sorted list of data records to be moved to the next non-disjoint layer. If the data processing system determines that no other sorted list of data records is to be moved to the next non-disjoint layer, no output of step 920, then the process terminates thereafter. Returning again to step 910, if the data processing system determines that no set of data records within the selected sorted list of data records corresponding to the particular key overlaps with data records within a set of sorted lists of data records stored in the next non-disjoint layer, no output of step 910, then the data processing system appends the selected sorted list of data records corresponding to the particular key to the next non-disjoint layer and deletes the selected sort list from the selected non-disjoint layer (step 922). Thereafter, the process returns to step 920 where the data processing system determines whether another sorted list of data records is to be moved to the next non-disjoint layer.

Figure 10C:
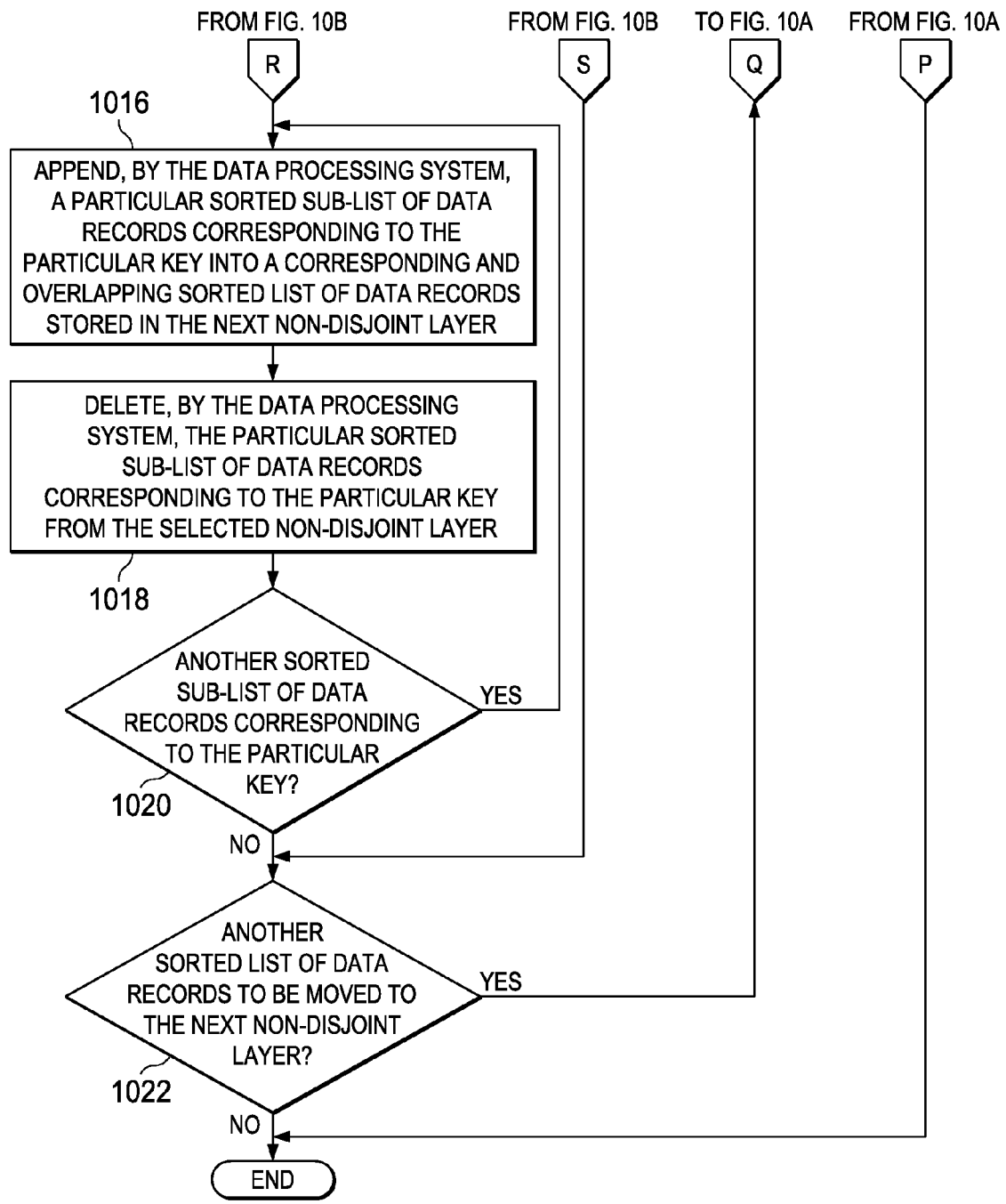

With reference now to FIGS. 10A-10C, a flowchart illustrating a process for increasing disk-merge bandwidth in a log data store is shown in accordance with an illustrative embodiment. The process shown in FIGS. 10A-10C may be implemented in a data processing system, such as, for example, data processing system 100 in FIG. 1.

The process begins when the data processing system monitors a number of data records stored within each non-disjoint layer in a set of non-disjoint layers within a plurality of non-disjoint layers of a log data store across a plurality of different types of data storage devices coupled to the data processing system (step 1002). The set of non-disjoint layers resides in a storage-class memory device of the data processing system, for example. The data processing system makes a determination as to whether the number of data records stored within a particular non-disjoint layer in the set of non-disjoint layers is equal to or greater than a threshold number of data records associated with the particular non-disjoint layer (step 1004).

If the data processing system determines that the number of data records stored within a particular non-disjoint layer in the set of non-disjoint layers is not equal to or greater than the threshold number of data records associated with the particular non-disjoint layer, no output of step 1004, then the process terminates thereafter. If the data processing system determines that the number of data records stored within a particular non-disjoint layer in the set of non-disjoint layers is equal to or greater than the threshold number of data records associated with the particular non-disjoint layer, yes output of step 1004, then the data processing system selects the particular non-disjoint layer that has the number of data records equal to or greater than the threshold number of data records associated with the particular non-disjoint layer (step 1006). In addition, the data processing system selects a sorted list of data records corresponding to a particular key within the selected non-disjoint layer to be moved to a next non-disjoint layer of the log data store (step 1008).

Further, the data processing system deletes each data record within the selected sorted list of data records corresponding to the particular key that has been overwritten in a previous non-disjoint layer of the log data store (step 1010). Afterward, the data processing system makes a determination as to whether a set of data records within the selected sorted list of data records corresponding to the particular key overlaps with data records within a set of sorted lists of data records stored in the next non-disjoint layer (step 1012). If the data processing system determines that a set of data records within the selected sorted list of data records corresponding to the particular key does overlap with data records within a set of sorted lists of data records stored in the next non-disjoint layer, yes output of step 1012, then the data processing system divides the selected sorted list of data records corresponding to the particular key into a set of sorted sub-lists of data records corresponding to the particular key based on a boundary of each set of data records within the set of sorted lists of data records stored in the next non-disjoint layer that overlaps with one or more data records in the selected sorted list of data records (step 1014).

Subsequently, the data processing system appends a particular sorted sub-list of data records corresponding to the particular key into a corresponding and overlapping sorted list of data records stored in the next non-disjoint layer (step 1016). The data processing system also deletes the particular sorted sub-list of data records corresponding to the particular key from the selected non-disjoint layer (step 1018). In addition, the data processing system makes a determination as to whether another sorted sub-list of data records corresponding to the particular key exits (step 1020).

If the data processing system determines that another sorted sub-list of data records corresponding to the particular key does exit, yes output of step 1020, then the process returns to step 1016 where the data processing system appends the other sorted sub-list of data records corresponding to the particular key into a corresponding and overlapping sorted list of data records stored in the next non-disjoint layer. If the data processing system determines that no other sorted sub-list of data records corresponding to the particular key exits, no output of step 1020, then the data processing system makes a determination as to whether another sorted list of data records is to be moved to the next non-disjoint layer (step 1022).

If the data processing system determines that another sorted list of data records is to be moved to the next non-disjoint layer, yes output of step 1022, then the process return to step 1008 where the data processing system selects the other sorted list of data records to be moved to the next non-disjoint layer of the log data store. If the data processing system determines that no other sorted list of data records is to be moved to the next non-disjoint layer, no output of step 1022, then the process terminates thereafter. Returning again to step 1012, if the data processing system determines that no set of data records within the selected sorted list of data records corresponding to the particular key overlaps with data records within a set of sorted lists of data records stored in the next non-disjoint layer, no output of step 1012, then the data processing system appends the selected sorted list of data records corresponding to the particular key to the next non-disjoint layer and deletes the selected sort list from the selected non-disjoint layer (step 1024). Thereafter, the process returns to step 1022 where the data processing system determines whether another sorted list of data records is to be moved to the next non-disjoint layer.

Figure 11B:
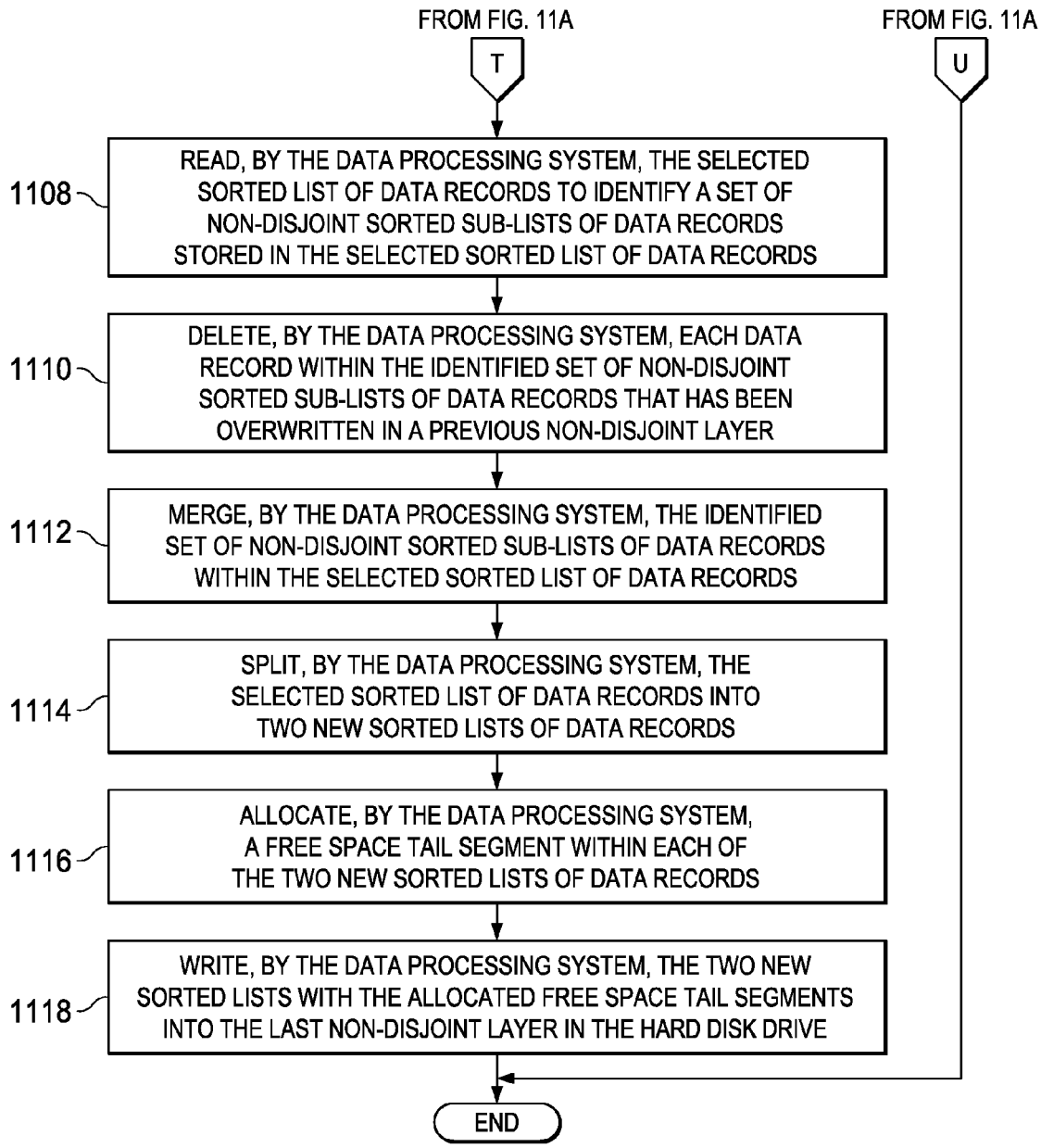

With reference now to FIGS. 11A-11B, a flowchart illustrating a process for compaction in a log data store is shown in accordance with an illustrative embodiment. The process shown in FIGS. 11A-11B may be implemented in a data processing system, such as, for example, data processing system 100 in FIG. 1.

The process begins when the data processing system monitors a number of data records stored within each sorted list of data records in a set of sorted lists of data records stored in a last non-disjoint layer within a plurality of non-disjoint layers of a log data store across a plurality of different types of data storage devices coupled to the data processing system (step 1102). The last non-disjoint layer resides in a hard disk drive of the data processing system, for example. The data processing system makes a determination as to whether the number of data records stored within a particular sorted list of data records in the set of sorted lists of data records is equal to or greater than a threshold number of data records associated with the particular sorted list of data records (step 1104).

If the data processing system determines that the number of data records stored within a particular sorted list of data records in the set of sorted lists of data records is not equal to or greater than the threshold number of data records associated with the particular sorted list of data records, no output of step 1104, then the process terminates thereafter. If the data processing system determines that the number of data records stored within a particular sorted list of data records in the set of sorted lists of data records is equal to or greater than the threshold number of data records associated with the particular sorted list of data records, yes output of step 1104, then the data processing system selects the particular sorted list of data records that has the number of data records equal to or greater than the threshold number of data records associated with the particular sorted list of data records (step 1106). In addition, the data processing system reads the selected sorted list of data records to identify a set of non-disjoint sorted sub-lists of data records stored in the selected sorted list of data records (step 1108).

Further, the data processing system deletes each data record within the identified set of non-disjoint sorted sub-lists of data records that has been overwritten in a previous non-disjoint layer (step 1110). Then, the data processing system merges the identified set of non-disjoint sorted sub-lists of data records within the selected sorted list of data records (step 1112). Afterward, the data processing system splits the selected sorted list of data records into two new sorted lists of data records (step 1114).

Furthermore, the data processing system allocates a free space tail segment within each of the two new sorted lists of data records (step 1116). The data processing system also writes the two new sorted lists with the allocated free space tail segments into the last non-disjoint layer in the hard disk drive (step 1118). The process terminates thereafter.

Thus, illustrative embodiments provide a method, computer program product, and data processing system for storing data records within a log data store that includes a plurality of successive non-disjoint layers inserted across a plurality of different types of data storage devices coupled to a data processing system. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for storing data records within a log data store, the method comprising:
   generating, by a data processing system, the log data store that stores data records within a plurality of successive non-disjoint layers inserted across a plurality of different types of data storage devices associated with the data processing system;
   inserting, by the data processing system, a first non-disjoint layer of the plurality of successive non-disjoint layers within a main memory device of the data processing system;
   inserting, by the data processing system, a set of intermediate non-disjoint layers of the plurality of successive non-disjoint layers within a set of storage-class memory devices of the data processing system;
   inserting, by the data processing system, a last non-disjoint layer of the plurality of successive non-disjoint layers within a hard disk drive of the data processing system;
   increasing, by the data processing system, a size of each successive non-disjoint layer in the plurality of successive non-disjoint layers exponentially by a predetermined factor value; and
   organizing, by the data processing system, the data records into the plurality of successive non-disjoint layers of the log data store inserted across the plurality of different types of data storage devices, wherein each successive non-disjoint layer in the plurality of successive non-disjoint layers includes a set of disjoint sorted lists of data records, and wherein each particular disjoint sorted list of data records in the set of disjoint sorted lists of data records corresponds to a particular key.

2. The method of claim 1, further comprising:
staging, by the data processing system, the data records from the first non-disjoint layer, layer-by-layer, to the last non-disjoint layer in the plurality of successive non-disjoint layers based on a non-disjoint layer equaling or exceeding a threshold number of data records associated with the non-disjoint layer.

3. The method of claim 1, further comprising:
writing, by the data processing system, non-overwritten data records to the last non-disjoint layer in the plurality of successive non-disjoint layers.

4. The method of claim 1, further comprising:
splitting, by the data processing system, a disjoint sorted list of data records within the last non-disjoint layer into two new sorted lists of data records in response to the disjoint sorted list of data records equaling or exceeding a threshold number of data records associated with the disjoint sorted list.

5. The method of claim 4, further comprising:
allocating, by the data processing system, a free space tail segment within each of the two new sorted lists of data records to provide zero merge amplification when merging new data records into the two new sorted lists.

6. The method of claim 1, further comprising:
generating, by the data processing system, a current version of a data record having a particular key based on retrieved versions of the data record included in selected sorted lists of data records within selected non-disjoint layers of the log data store.

7. The method of claim 1, further comprising:
deleting, by the data processing system, each data record within a selected sorted list of data records corresponding to a particular key that has been overwritten in a previous non-disjoint layer of the log data store.

8. The method of claim 1, further comprising:
responsive to the data processing system determining that a set of data records within a selected sorted list of data records corresponding to a particular key overlaps with data records within a set of sorted lists of data records stored in a next non-disjoint layer in the plurality of non-disjoint layers of the log data store, dividing, by the data processing system, the selected sorted list of data records corresponding to the particular key into a set of sorted sub-lists of data records corresponding to the particular key based on a boundary of each set of data records within the set of sorted lists of data records stored in the next non-disjoint layer that overlaps with one or more data records in the selected sorted list of data records; and
appending, by the data processing system, each particular sorted sub-list of data records corresponding to the particular key into a corresponding and overlapping sorted list of data records stored in the next non-disjoint layer.

* * * * *